(12) United States Patent
De Luna et al.

(10) Patent No.: US 12,664,697 B1
(45) Date of Patent: Jun. 23, 2026

(54) PIXEL MAPPING FOR HEATMAP VISUALIZATIONS

(71) Applicant: Cisco Technology, Inc., San Jose, CA (US)

(72) Inventors: Justin Wai-Yee De Luna, San Francisco, CA (US); Jeremy Robert Snyder, Seattle, WA (US); Eric Allen Wohlstadter, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 73 days.

(21) Appl. No.: 18/786,217

(22) Filed: Jul. 26, 2024

(51) Int. Cl.
  *G06T 11/10* (2026.01)
  *G06T 11/26* (2026.01)
(52) U.S. Cl.
  CPC .............. *G06T 11/10* (2026.01); *G06T 11/26* (2026.01)
(58) Field of Classification Search
  None
  See application file for complete search history.

(56) References Cited

U.S. PATENT DOCUMENTS

| | | | |
|---|---|---|---|
| 7,937,344 | B2 | 5/2011 | Baum et al. |
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 2012/0262472 | A1* | 10/2012 | Garr ........................ G06T 11/26 345/589 |
| 2019/0098106 | A1 | 3/2019 | Mungel et al. |

OTHER PUBLICATIONS

Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.

(Continued)

*Primary Examiner* — Peter Hoang
(74) *Attorney, Agent, or Firm* — Kilpatrick Townsend & Stockton LLP

(57) ABSTRACT

Techniques, which may be embodied herein as systems, computing devices, methods, algorithms, software, code, computer readable media, or the like, are described herein for generating heatmap visualizations. A heatmap visualization can be a graphical representation of data where the coordinates of a cell in the visualization can be a key that describes a group of data represented by the cell. The colors of a heatmap may indicate information about the data represented by the cell (e.g., the amount of data in the cell). These cells can be rendered by calculating a per-pixel metric rate for each dataset in the heatmap visualization and mapping a dataset's rate onto pixels within the visualization that correspond to the dataset. After this mapping, the maximum rate within the visualization can be used to determine the visualization's colors and the cells can be rendered by coloring each pixel (e.g. pixel row) in its corresponding color.

20 Claims, 12 Drawing Sheets

(56) References Cited

OTHER PUBLICATIONS

Carraso, David, "Exploring Splunk," published by CITO Research, New York, NY, Apr. 2012.
Bitincka, Ledion et al., "Optimizing Data Analysis with a Semi-structured Time Series Database," self-published, First presented at "Workshop on Managing Systems via Log Analysis and Machine Learning Techniques (SLAML)", Vancouver, British Columbia, Oct. 3, 2010.

\* cited by examiner

FROM BLOCK 212 IN FIG. 2A                    200
                                             (contd)

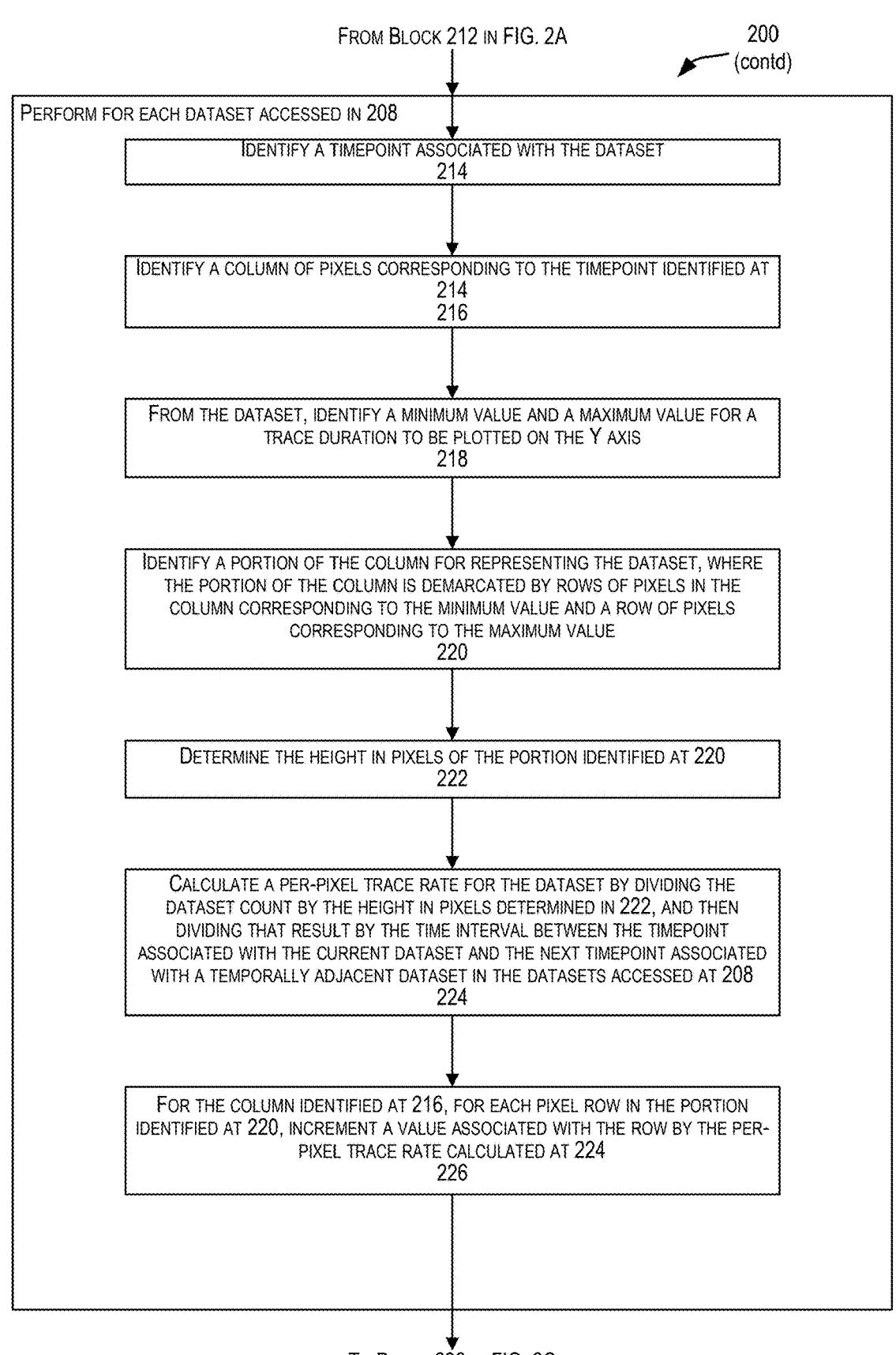

PERFORM FOR EACH DATASET ACCESSED IN 208

IDENTIFY A TIMEPOINT ASSOCIATED WITH THE DATASET
214

IDENTIFY A COLUMN OF PIXELS CORRESPONDING TO THE TIMEPOINT IDENTIFIED AT
214
216

FROM THE DATASET, IDENTIFY A MINIMUM VALUE AND A MAXIMUM VALUE FOR A
TRACE DURATION TO BE PLOTTED ON THE Y AXIS
218

IDENTIFY A PORTION OF THE COLUMN FOR REPRESENTING THE DATASET, WHERE
THE PORTION OF THE COLUMN IS DEMARCATED BY ROWS OF PIXELS IN THE
COLUMN CORRESPONDING TO THE MINIMUM VALUE AND A ROW OF PIXELS
CORRESPONDING TO THE MAXIMUM VALUE
220

DETERMINE THE HEIGHT IN PIXELS OF THE PORTION IDENTIFIED AT 220
222

CALCULATE A PER-PIXEL TRACE RATE FOR THE DATASET BY DIVIDING THE
DATASET COUNT BY THE HEIGHT IN PIXELS DETERMINED IN 222, AND THEN
DIVIDING THAT RESULT BY THE TIME INTERVAL BETWEEN THE TIMEPOINT
ASSOCIATED WITH THE CURRENT DATASET AND THE NEXT TIMEPOINT ASSOCIATED
WITH A TEMPORALLY ADJACENT DATASET IN THE DATASETS ACCESSED AT 208
224

FOR THE COLUMN IDENTIFIED AT 216, FOR EACH PIXEL ROW IN THE PORTION
IDENTIFIED AT 220, INCREMENT A VALUE ASSOCIATED WITH THE ROW BY THE PER-
PIXEL TRACE RATE CALCULATED AT 224
226

TO BLOCK 228 IN FIG. 2C

FIG. 2B

FROM BLOCK 226 IN FIG. 2B 200
(contd)

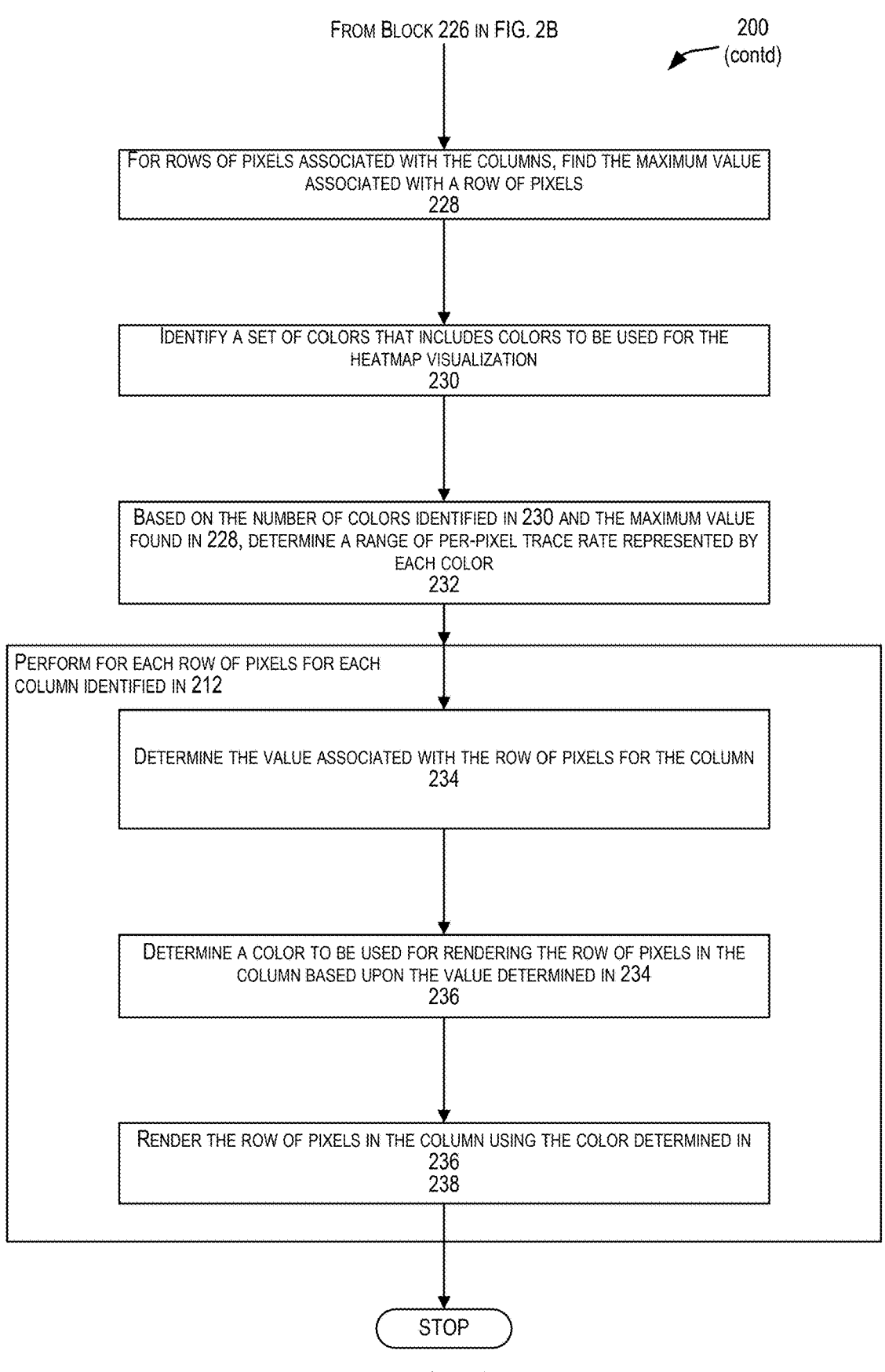

FOR ROWS OF PIXELS ASSOCIATED WITH THE COLUMNS, FIND THE MAXIMUM VALUE
ASSOCIATED WITH A ROW OF PIXELS
228

IDENTIFY A SET OF COLORS THAT INCLUDES COLORS TO BE USED FOR THE
HEATMAP VISUALIZATION
230

BASED ON THE NUMBER OF COLORS IDENTIFIED IN 230 AND THE MAXIMUM VALUE
FOUND IN 228, DETERMINE A RANGE OF PER-PIXEL TRACE RATE REPRESENTED BY
EACH COLOR
232

PERFORM FOR EACH ROW OF PIXELS FOR EACH
COLUMN IDENTIFIED IN 212

DETERMINE THE VALUE ASSOCIATED WITH THE ROW OF PIXELS FOR THE COLUMN
234

DETERMINE A COLOR TO BE USED FOR RENDERING THE ROW OF PIXELS IN THE
COLUMN BASED UPON THE VALUE DETERMINED IN 234
236

RENDER THE ROW OF PIXELS IN THE COLUMN USING THE COLOR DETERMINED IN
236
238

STOP

FIG. 2C

800

RECEIVE A REQUEST TO DISPLAY A VISUALIZATION FOR A PLURALITY OF DATASETS
802

FOR A FIRST DATASET IN THE PLURALITY OF DATASETS

IDENTIFY A FIRST TIMEPOINT BASED ON TIME INFORMATION ASSOCIATED WITH THE FIRST DATASET
804

IDENTIFY A COLUMNAR AREA OF PIXELS IN THE VISUALIZATION CORRESPONDING TO THE FIRST TIMEPOINT
806

IDENTIFY A FIRST PORTION OF THE COLUMNAR AREA OF PIXELS FOR DISPLAYING THE  FIRST DATASET
808

DETERMINE A FIRST COLOR FROM A PLURALITY OF COLORS FOR DISPLAYING THE FIRST PORTION FOR REPRESENTING THE FIRST DATASET
810

DISPLAY THE VISUALIZATION
812

FIG. 8

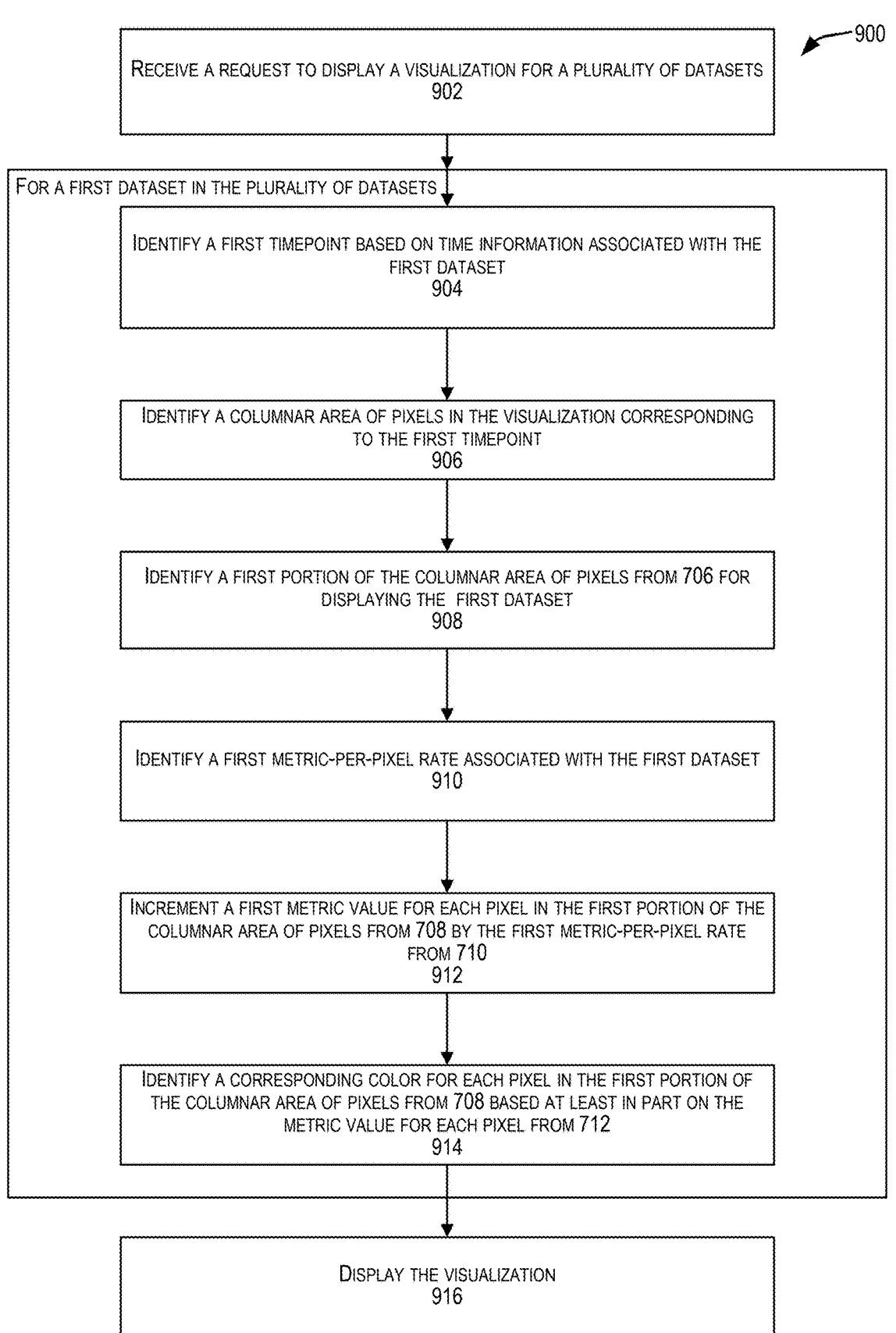

900

RECEIVE A REQUEST TO DISPLAY A VISUALIZATION FOR A PLURALITY OF DATASETS
902

FOR A FIRST DATASET IN THE PLURALITY OF DATASETS

IDENTIFY A FIRST TIMEPOINT BASED ON TIME INFORMATION ASSOCIATED WITH THE FIRST DATASET
904

IDENTIFY A COLUMNAR AREA OF PIXELS IN THE VISUALIZATION CORRESPONDING TO THE FIRST TIMEPOINT
906

IDENTIFY A FIRST PORTION OF THE COLUMNAR AREA OF PIXELS FROM 706 FOR DISPLAYING THE FIRST DATASET
908

IDENTIFY A FIRST METRIC-PER-PIXEL RATE ASSOCIATED WITH THE FIRST DATASET
910

INCREMENT A FIRST METRIC VALUE FOR EACH PIXEL IN THE FIRST PORTION OF THE COLUMNAR AREA OF PIXELS FROM 708 BY THE FIRST METRIC-PER-PIXEL RATE FROM 710
912

IDENTIFY A CORRESPONDING COLOR FOR EACH PIXEL IN THE FIRST PORTION OF THE COLUMNAR AREA OF PIXELS FROM 708 BASED AT LEAST IN PART ON THE METRIC VALUE FOR EACH PIXEL FROM 712
914

DISPLAY THE VISUALIZATION
916

FIG. 9

PIXEL MAPPING FOR HEATMAP VISUALIZATIONS

CROSS REFERENCE TO RELATED APPLICATIONS

This application is related to U.S. patent application Ser. No. 18/786,212, entitled "HEATMAP VISUALIZATION GENERATION TECHNIQUES": filed Jul. 26, 2024, which is incorporated by reference herein in its entirety.

BACKGROUND

Heatmap visualizations are popularly used to graphically represent data. A heatmap visualization can comprise a grid of even sized cells where information is conveyed by both the location (e.g., the particular cell of the grid) and color of the cells conveys information. Generally, the data in a heatmap visualization are represented by a grid of even sized cells. For example, the average daily rainfall in Sao Palo Brazil can be represented as a 4×3 grid of cells where each cell represents a month, and the color of each cell can vary based on the average daily rainfall for that month. However, certain types of data are not amenable for displaying using a heatmap visualization, because of the distribution of the data, for example where a large proportion of the data may be concentrated to a few cells of the heatmap's grid.

BRIEF DESCRIPTION OF THE DRAWINGS

Illustrative examples are described in detail below with reference to the following figures:

FIGS. 2A-2C is a simplified diagram of a technique for generating a heatmap visualization according to at least one embodiment.

FIGS. 8-9 show simplified diagrams of techniques for generating a heatmap visualization according to at least one embodiment.

DETAILED DESCRIPTION OF THE INVENTION

Figure 1:
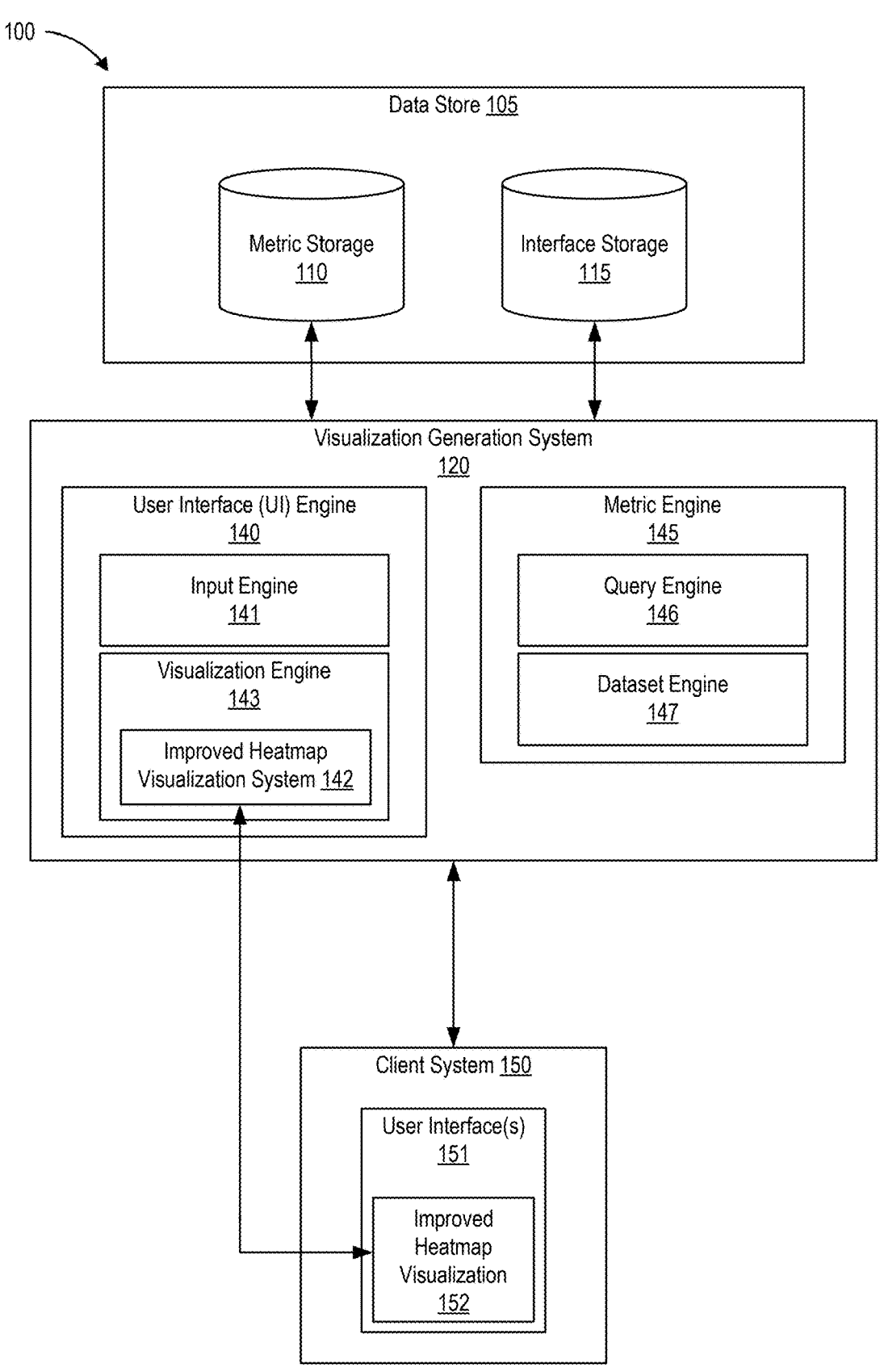
FIG. 1 shows an overview of an example environment for generating a heatmap visualization according to at least one embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

Techniques, which may be embodied herein as systems, computing devices, methods, algorithms, software, code, computer readable media, or the like, are described herein for generating grid heatmap visualizations (e.g., a heatmap visualization). A heatmap visualization can be a graphical representation of data where a color palate, or pattern palate, indicates information about data within the graph. In contrast to a spatial heatmap visualization that represents geographic data (e.g., temperature readings on a map), a grid heatmap visualization can be a grid of cells, where the location and color of the cells convey information about the datasets represented in the visualization. The coordinates of a cell in a heatmap visualization can be a key that describes a group of data represented by the cell. For example, a heatmap could represent the average rainfall in Texas. The y-axis could be the months of the year, and the x-axis could be cities in the state. The color can be the value associated with that key. So, the rainfall for Houston in July could be determined by finding Houston on the x-axis, July on the y-axis and determining the color of a cell at the intersection of the two axis points. The colors of a heatmap may indicate the density data at a point, region, portion, cell, etc. within the heatmap visualization. However, the color for data can indicate any information about data corresponding to the color. For instance, the color could indicate a standard deviation from a mean or another statistical or descriptive characteristic of the data.

The disclosed techniques offer improvements over conventional heatmap visualizations. In conventional heatmap visualizations, the size of each cell is fixed and the granularity of the visualization is determined without considering the actual distribution of the data. Accordingly, a substantial portion of the data can be concentrated in relatively few cells and the data can be difficult to interpret. A cell can be a continuous portion of the heatmap visualization that is rendered in a particular color. The disclosed heatmap visualization techniques allow for dynamic cell sizes. Instead of pouring a dataset into a single cell, a region of pixels is selected for each time period. The datasets for that time period are used to calculate a per-pixel metric rate. Each pixel corresponding to a dataset is incremented by that dataset's per-pixel metric rate. After all of the datasets are mapped to their respective pixels, a maximum per-pixel metric rate is calculated by dividing the maximum metric rate for a pixel is divided by the number of available colors for a visualization. Once the colors are determined, each pixel is rendered in the color corresponding to the pixel's metric rate.

Turning now to FIG. 1, FIG. 1 shows an overview of an example architecture for generating heatmap visualizations according to at least one embodiment. As illustrated, architecture 100 includes a data store 105 with a metric storage 110 and an interface storage 115.

The data store 105 can include any combination of hardware and software for storing information for generating heatmap visualizations of metric data. Metric storage 110 can include stored metrics (e.g., metric data) and for example, the stored metrics can any information for root cause analysis such as information about one or more traces. A trace can be a collection of operations (e.g., spans) associated with a system of applications and/or services, and each trace can correspond to a unique transaction. For example, a trace can be the spans associated with a particular request to access a webpage. A trace stored in metric storage 110 can include a start time for the trace and an end time for the trace. In various embodiments, the metrics can include any time series information. Interface storage 115 can include code for generating user interfaces (e.g., code to cause a client system to display a user interface) and/or information identifying a plurality of colors for displaying the heatmap visualization.

As further illustrated, the visualization generation system 120 includes a user interface (UI) engine 140 and a metric engine 145. The visualization generation system can be implemented in hardware, in software, or any combination of hardware and software. As described further herein, the user interface (UI) engine 140 may include one or more modules or services designed to analyze and present metric data, such as controlled browser test metric and/or observed browser metrics and the information they comprise. The metric data analyzed by the user interface (UI) engine 140 can be provided by the metric engine 145 as an improved heatmap visualization system 152 that is generated by the improved heatmap visualization system 152. Combined, the metric UI engine 140 and the query system 145 may provide functionality to the client system 150 to visualize, and interact with, metric data. For example, the user interface (UI) engine 140 may generate a heatmap visualization for a dataset of metric data that is received from the metric engine 140.

User interface (UI) engine 140 can request browser metrics from the data store 105 by providing a query to the metric engine 145. The query can be received via the input engine 141 of the user interface (UI) engine 140. For example, the visualization engine 143 can retrieve code that would cause client system 150 to display user interfaces 151. The user interface (UI) engine 140 can provide this code to the client system 150, and the client system can display user interface(s) 151 in response to the provided code. The client system 150 can receive input identifying metrics for which a heatmap visualization is requested (e.g., a query). For example, the input can be a range of timepoints and a range of metric values. Information identifying the range of timepoints, and the range of metric values can be received at the user interface(s) 151 as numeric values (e.g., a minimum and a maximum value for each range). For example, the user interface can receive the information as numeric values input to a text field or by clicking and dragging on the user interface to select a range of values within a portion of the user interface for displaying the heatmap visualization.

In response to receiving a query, the query engine 146 of metric engine 145 can identify metrics in the metric storage 110 that correspond to the information identifying metrics from the query. The query engine 146 can retrieve information about the identified metrics and provide those metrics to the dataset engine 147. The dataset engine 147 can process the information about the identified metrics into a dataset that is suitable for generating a heatmap visualization. For example, the dataset engine 147 can use the information about the identified metrics to determine a minimum metric value, a maximum metric value, a minimum time point, a maximum time point, and a total number of metrics. In some embodiments, the minimum timepoint and the maximum timepoint can be the same timepoint (e.g., the dataset can include metrics corresponding to a single point in time). The dataset engine can use the information about the identified metrics to calculate a metric-rate for a dataset by dividing the total number of metrics by the time period (e.g., the difference between the minimum and maximum timepoints) corresponding to the dataset. The metric engine 146 may generate multiple datasets in response to a query from the query engine 146 and multiple datasets may correspond to a single time period. The dataset engine 147 can provide the datasets identified in response to the query to the visualization engine 143 (e.g., the improved heatmap visualization system 142 within the visualization engine 143).

Upon or after datasets are provided by the query system 145, the user interface (UI) engine 140 can process the metric datasets for display by the user interface(s) 151. The visualization engine 143 (e.g., the improved heatmap visualization system 142) can create a graphical display using one or more of the datasets generated by the dataset engine. The visualization engine 143 may use information about a display device of the client system 150, that is to display the user interface(s) 151, to process the datasets to prepare for the visualization. For example, the client system 150 may provide information identifying a two-dimensional array of pixels that are available for displaying the user interface(s) 151. The visualization engine 143 may use this pixel information to identify a columnar area of pixels within this array for displaying each dataset. The columnar area can be a width of pixels and a height of pixels corresponding to a timepoint or a time period. The visualization engine 143 may determine a mapping of metric values to vertical pixels, and the visualization engine 143 may use this mapping, and the range of metric values in the dataset, to determine a portion of the columnar area of pixels for displaying the dataset.

Then visualization engine 143 can divide the metric-rate determined by the dataset engine 147 by the number of vertical pixels in the portion of the columnar area to determine a per-pixel-metric-rate. The pixels that are to display a particular dataset can be incremented by the per-pixel-metric-rate for that particular dataset. If multiple datasets overlap, the pixels in the overlapping portion of the two-dimensional array for displaying the dataset can be incremented by the per-pixel-metric-rate for each of the multiple datasets. The per-pixel-metric-rates for each dataset that is to be displayed on a pixel can be summed together to determine the pixel's per-pixel-metric-rate. Upon or after the per-pixel-metric-rate for each dataset has been mapped onto the two-dimensional array of pixels, the visualization engine 143 can determine a maximum per-pixel-metric-rate within the two-dimensional array of pixels. The maximum per-pixel-metric-rate can be greater than the per-pixel-metric-rate for any individual dataset because the per-pixel-metric-rate for pixels within overlapping datasets can be additively combined.

The visualization engine 143 can use the maximum per-pixel-metric-rate to determine the color for each pixel in the heatmap visualization. For example, the visualization engine 143 can retrieve colors for displaying the heatmap visualization from the interface storage 115. In some embodiments, the colors for displaying the heatmap visualization may be identified by input to the user interface 151. The visualization engine 143 can divide the maximum per-pixel-metric-rate by the number of colors that are to be used to display the heatmap visualization. Each color can be assigned to an equal range of the maximum per-pixel-metric-rate. For example, if the maximum per-pixel-metric-rate is 99 metrics per pixel and there are five colors, a first color will be assigned to pixels with a per-pixel-metric-rate of between 0 and 19 metrics per pixel, a second color will be assigned to pixels with a per-pixel-metric-rate of between 20 and 39 metrics per pixel, a third color will be assigned to pixels with a per-pixel-metric-rate of between 40 and 69 metrics per pixel, a fourth color will be assigned to pixels with a per-pixel-metric-rate of between 70 and 89 metrics per pixel, and a fifth color will be assigned to pixels with a per-pixel-metric-rate of between 80 and 99 metrics per pixel. Input to the user interface(s) 151 can be used to adjust the number of colors in a heatmap visualization and a lager number of colors can increase the granularity of the visualized data in the heatmap. The graphical display can be the graphical display described below in relation to FIGS. 6-7. The graphical display can be presented on a display device in client system 150 as part of the user interface(s) 151.

Figure 2A:
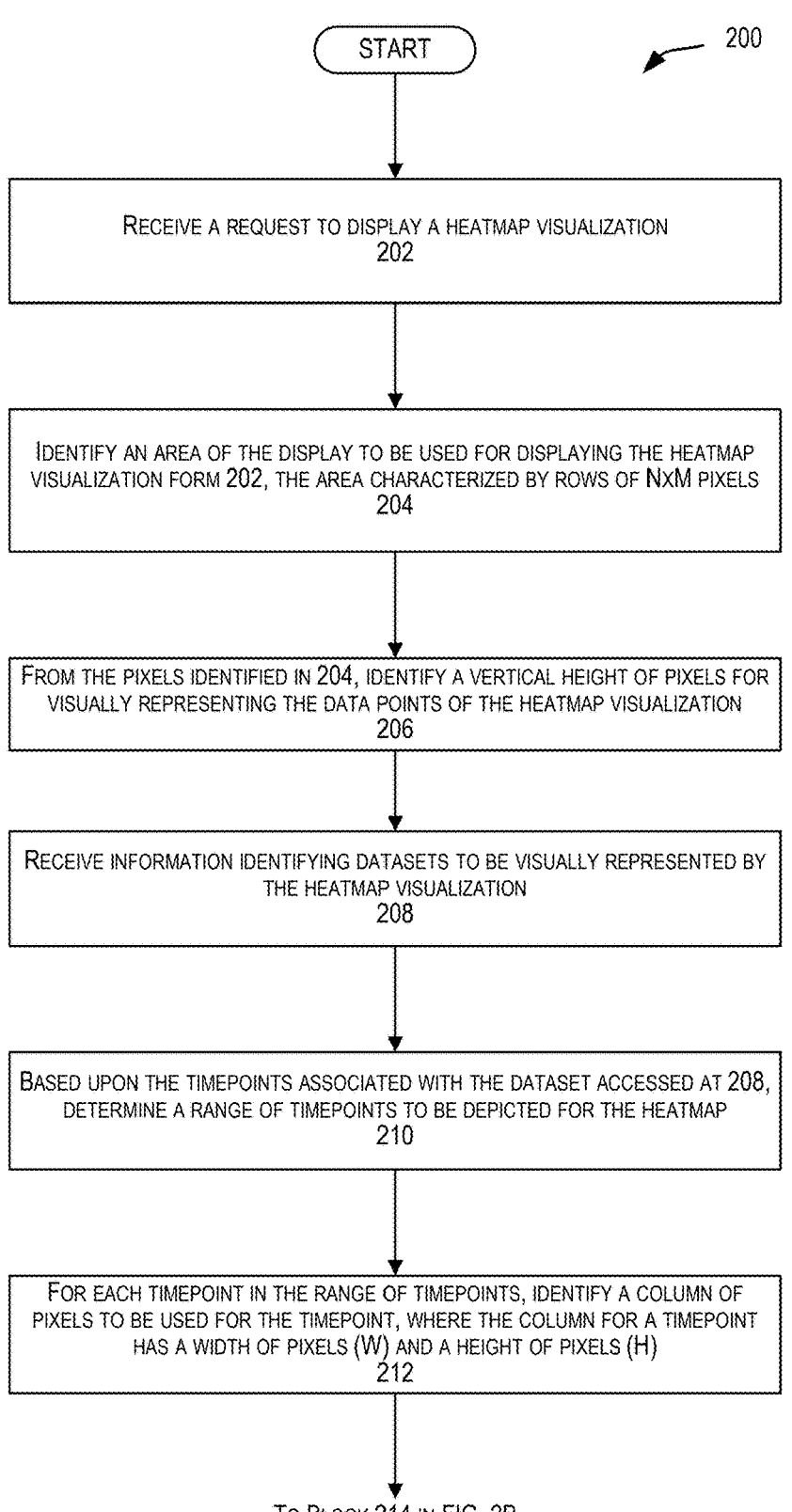

FIGS. 2A-2C are simplified diagrams of a technique 200 for generating a heatmap visualization according to at least one embodiment. This technique is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the techniques.

Turning to technique 200 as shown in FIG. 2A in greater detail, at block 202, a request to display a heatmap visualization can be received.

At block 204, an area of the display to be used for displaying the heatmap visualization from 202 can be identified. The area can be characterized by rows of N×M pixels.

At block 206, a vertical height for visually representing the data points of the heatmap visualization can be identified from the pixels identified at 204.

At block 208, information identifying the datasets to be visually represented by the heatmap visualization can be received. The information can be received from client system 150 by input engine 141. The information can be a range of values for metrics that are to be displayed. In some embodiments, the information can be received at the input engine 141 via the user interface(s) 151. For example, the input can be a selection of a section of a heatmap that is currently displayed by user interface(s) 151. The selection can be a request to zoom into the selected area of the heatmap, and the input can be a provided by a user "clicking and dragging" on the user interface to select a rectangular area of the heatmap.

In some embodiments, the information identifying the dataset can be a request for a heatmap visualization of metric data from a particular source and a particular time range. In such circumstances, the maximum and minimum metric values can be the maximum and minimum metric value generated by the particular source during the particular time range. In other embodiments, the minimum and maximum metric values that are to be displayed on a heatmap visualization can be specified by the input.

At block 210, a range of timepoints to be displayed on the heatmap can be determined. The range of timepoints can be determined based on the timepoints associated with the dataset accessed at 208.

At block 212, a column of pixels to be used for each timepoint can be identified. The column for a timepoint can have a width of pixels (W) and a height of pixels (H).

Turning to technique 200 as shown in FIG. 2B in greater detail, blocks 214-228 can be performed for each dataset accessed at 208. At block 214, a timepoint associated with the dataset can be identified. The timepoint can be any time point within the minimum and maximum timepoints corresponding to the dataset.

At block 216, a column of pixels corresponding to the timepoint identified at 214 can be identified.

At block 218, a minimum value and a maximum value for a metric can be identified.

The metric can be trace duration in some embodiments.

At block 220, a portion of the column for representing the dataset can be identified. The portion of the column can be demarcated by rows of pixels in the column corresponding to the maximum value and a row of pixels corresponding to the maximum value.

At block 222, the height in pixels of the portion identified at 220 can be determined. The height in pixels can be the number of pixels along the vertical axis of the portion identified at 220.

At block 224, a per-pixel-metric-rate can be determined for the dataset. The per-pixel-metric-rate can be the per-pixel trace rate for the dataset (e.g., the traces per second for each pixel). The per-pixel trace rate can be determined by dividing the total number of metrics (e.g., the metric count) by a time interval associated with the current dataset. The time interval can be an interval between a timepoint associated with the current dataset and a next timepoint associated with a temporally adjacent dataset in the datasets accessed at 208. Each dataset can be associated with a minimum timepoint and a maximum timepoint. In such circumstances, the timepoint associated with a dataset can be any timepoint between the minimum and maximum timepoints. The metric-rate can be used to determine the per-pixel-metric-rate by dividing the metric-rate by the height in pixels determined in 222.

At block 226, for the column identified at 216, increment a value associated with each row in the portion identified at 220 by the per-pixel-metric-rate calculated at 224. If a pixel corresponds to multiple datasets, the value can be a per-pixel-metric-rate that is greater than the per-pixel-metric-rate of a single dataset because the value is incremented by the per-pixel-metric-rate of each dataset.

Turning to technique 200 as shown in FIG. 2C in greater detail, at block 228, a maximum value associated with a row of pixels can be found. The value can be the value that is incremented at 226. The value can be the maximum value of any row of pixels in the heatmap visualization or the value can be the maximum value of a particular column within the heatmap visualization. The value can be a per-pixel-metric-rate such as a per-pixel traces rate.

At block 230, a set of colors that includes colors to be used for the heatmap visualization can be identified. The colors can include a gradient of a single color from dark to light. Identifying a set of colors can include identifying a number of colors. The identified colors and the number of colors can be specified in the request to display a heatmap visualization received at 202. In some embodiments, the number of colors can be selected by the visualization generation system based on the metric count with more colors selected for larger metric counts.

At block 232, a range of per-pixel-metric-rates that correspond to each color from 230 can be determined. The maximum value (e.g., the maximum per-pixel-metric-rate) can be used to determine the range of per-pixel-metric-rates. The maximum value can be divided by the number of colors in the set of colors identified at 230. Each color can be associated with a range of per-pixel-metric-rate values and each range can be contiguous. In embodiments where the colors are a monochrome gradient, the per-pixel-metric-rate range associated with each color can mirror the gradient (e.g., the magnitude of the values in each color's range can increase or decrease as the colors progress up or down the gradient).

Blocks 234 to 238 can be performed for each row of pixels for each column identified at 212. At block 234, the value for a row of pixels can be determined. The value can be the sum of the per-pixel-metric-rates for each dataset that corresponds to the row of pixels. For instance, the value can be the value that was incremented at 226.

At block 236, a color to be use for rendering the row of pixels in the column can be determined based upon the value determined at 234. For example, the color for a row of pixels can be determined if the value for the row is a per-pixel-metric-rate that is contained within the range of per-pixel-metric-rates corresponding to the color.

At block 238, the row of pixels in the column can be rendered using the color determined in 236.

Figure 3:
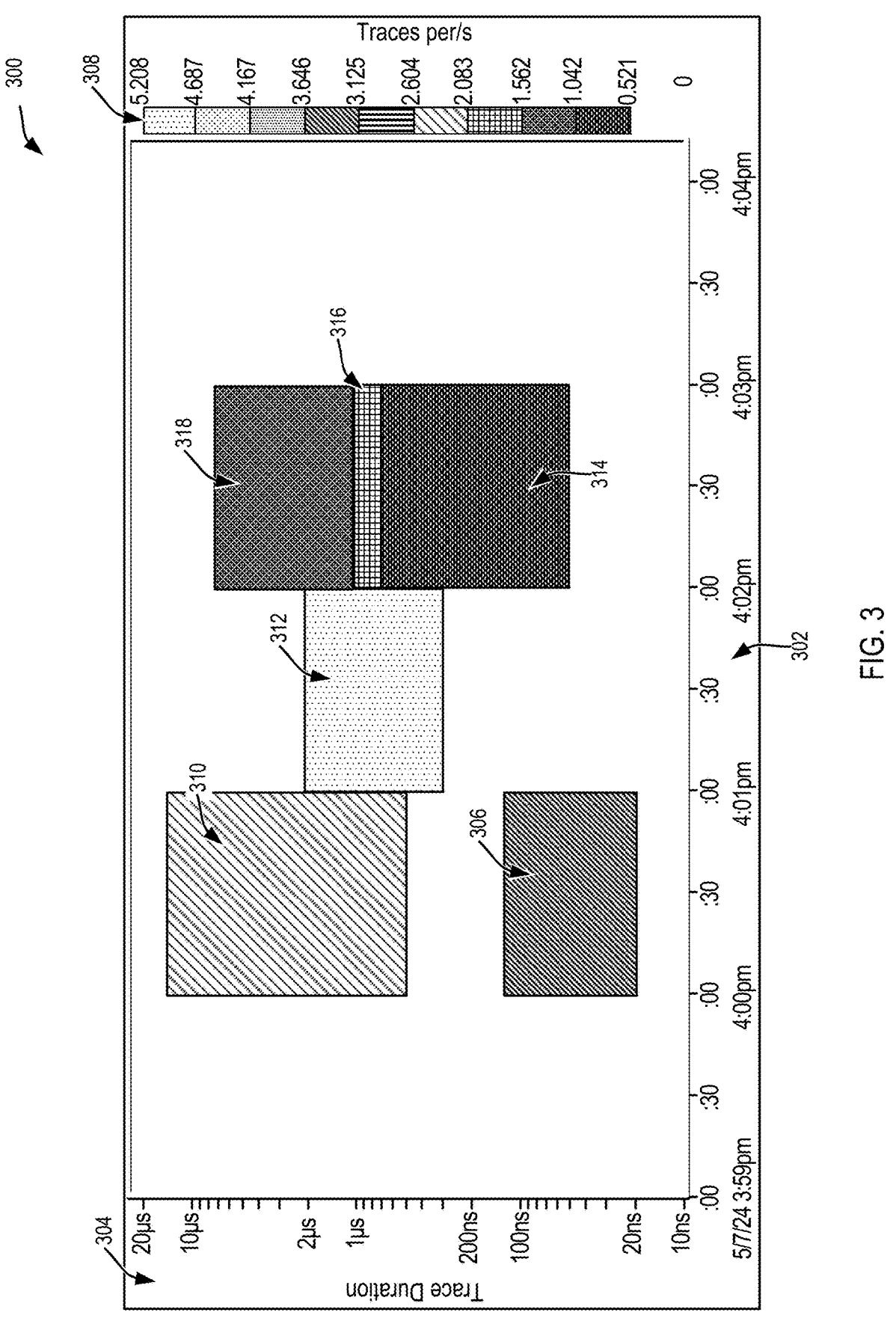
FIG. 3 shows a simplified diagram of a user interface for displaying a heatmap visualization according to at least one embodiment.

FIG. 3 shows a simplified diagram of a user interface for displaying a heatmap visualization according to at least one embodiment. The heatmap visualization is generated by displaying five separate datasets of trace data that were identified in a request. The request can specify a time range (shown on the x-axis 302) and a metric range (shown on the y-axis 304). The request may identify a maximum value and a minimum value for each range. The user interface may round the minimum value and the maximum value to a round value (e.g., the minimum metric value can be rounded from 11.3 ns to 10 ns on the y-axis), but the unrounded values may be used to retrieve datasets.

As shown in FIG. 3, the metric shown on the y-axis 304 can be a trace duration. A trace can be a one or more operations associated with a system application or service and the trace duration can be the time that it takes to execute the operations of the trace. The y-axis 304 is logarithmic and the x-axis is linear, but either axis can be logarithmic or linear.

Graphical element 306 is a visual representation of a first dataset. The dataset contains 20,000 traces that have a trace duration between 20 nanoseconds and 120 nanoseconds that were generated between 4:00 μm and 4:01 pm. The height in pixels of the columnar area for this dataset is 120 pixels because trace durations from 20 nanoseconds to 120 nanoseconds are represented by 120 pixels. So, the metric-rate for the first dataset is approximately 2.78 traces per second per pixel (20,000 traces/60 seconds/120 pixels). The color scale 308 visually identifies graphical element 306 as having between 2.604 and 3.125 traces per second per pixel.

Graphical element 310 is a visual representation of a second dataset. The dataset contains 20,000 traces that have a trace duration between 600 nanoseconds and 14,000 nanoseconds that were generated between 4:00 μm and 4:01 pm. The height in pixels of the columnar area for this dataset is 120 pixels because trace durations from 600 nanoseconds to 14,000 nanoseconds are represented by 200 pixels. So, the metric-rate for the first dataset is approximately 1.67 traces per second per pixel (20,000 traces/60 seconds/200 pixels).

Graphical element 312 is a visual representation of a third dataset. The dataset contains 40,000 traces that have a trace duration between 300 nanoseconds and 2,000 nanoseconds that were generated between 4:01 μm and 4:02 pm. The height in pixels of the columnar area for this dataset is 120 pixels because trace durations from 300 nanoseconds to 2,000 nanoseconds are represented by 120 pixels. So, the metric-rate for the first dataset is approximately 6.56 traces per second per pixel (40,000 traces/60 seconds/120 pixels).

The time period between 4:02 pm and 4:03 pm includes a fourth dataset and a fifth dataset. These datasets contain traces and the range of trace durations in the two datasets overlap. So, the datasets are represented in the heatmap visualization by three different graphical elements: two for the non-overlapping areas of the visualization and one for the overlapping area. For example, graphical element 314 represents a first portion of the fourth dataset, graphical element 316 represents a second portion of the fourth dataset as well as a first portion of the fifth dataset, and graphical element 318 represents a second portion of the fifth dataset.

Graphical element 314 and graphical element 316 are, at least in part, visual representations of the fourth dataset. The dataset contains 10,000 traces that have a trace duration between 60 nanoseconds and 1,000 nanoseconds that were generated between 4:02 pm and 4:03 pm. The height in pixels of the columnar area for this dataset is 180 pixels because trace durations from 60 nanoseconds to 1,000 nanoseconds are represented by 180 pixels. So, the metric-rate for the first dataset is approximately 0.926 traces per second per pixel (10,000 traces/60 seconds/180 pixels). Graphical element 314 is rendered to display a color corresponding to 0.926 traces per pixel per second and the value for the pixels within graphical element 316 are incremented by 0.926 traces per pixel per second.

Graphical element 316 is also, in part, visual representations of the fifth dataset. So the traces per pixel per second for the fifth dataset may need to be determined before the color representing graphical element 316 can be determined. The dataset contains 10,000 traces that have a trace duration between 60 nanoseconds and 1,000 nanoseconds that were generated between 4:02 pm and 4:03 pm. The height in pixels of the columnar area for this dataset is 150 pixels because trace durations from 800 nanoseconds to 8,000 nanoseconds are represented by 150 pixels. So, the metric-rate for the first dataset is approximately 1.11 traces per second per pixel (10,000 traces/60 seconds/150 pixels). As discussed above, the fifth dataset is represented by both graphical element 316 and graphical element 318. Graphical element 318 is rendered to display a color corresponding to 1.11 traces per pixel per second and the value for the pixels within graphical element 316 are incremented from 0.926 traces per pixel per second by 1.11 traces per pixel per second. The resulting value for graphical element 316 is 2.036 traces per second per pixel and this value is used to select a corresponding color.

Figure 4:
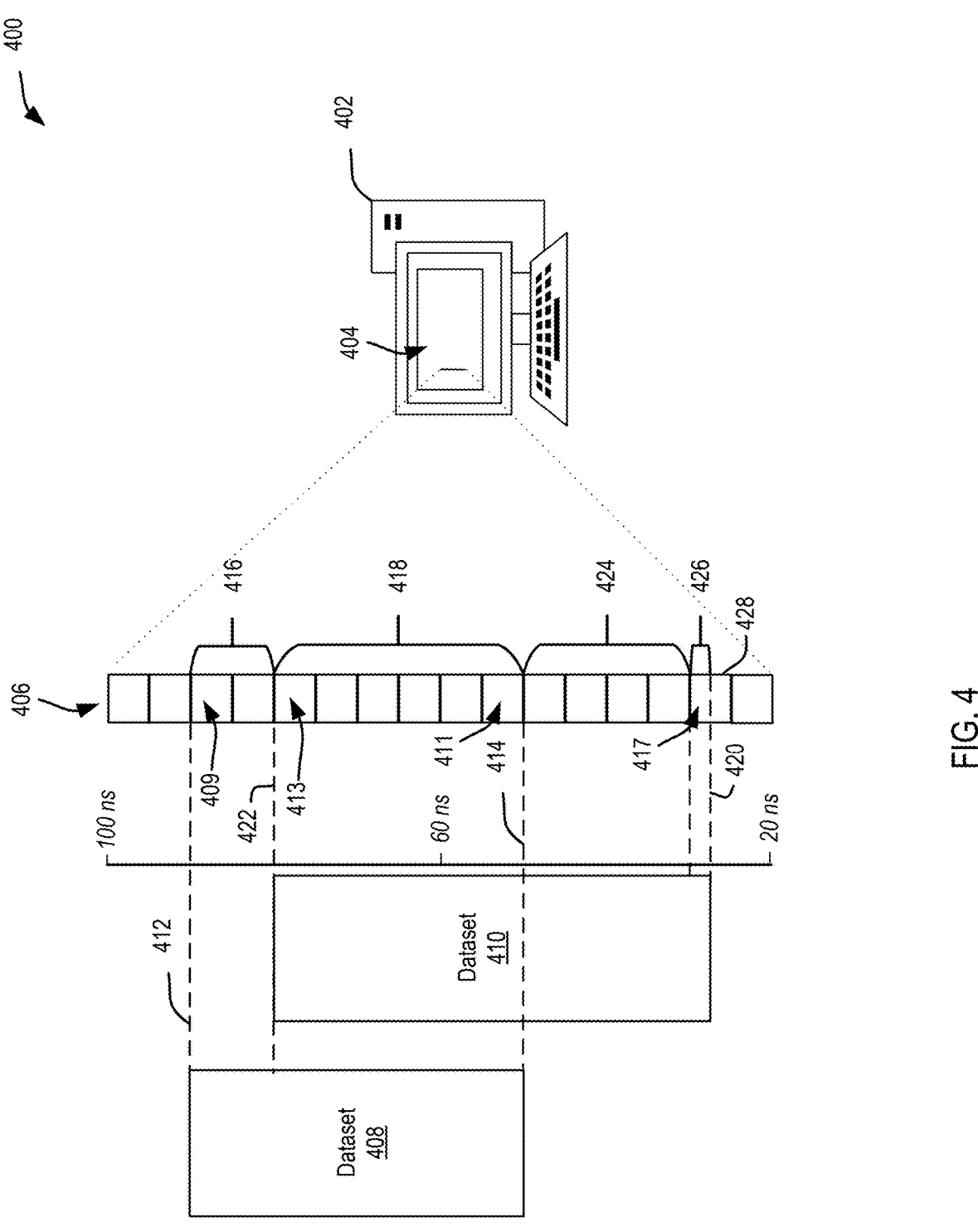
FIG. 4 is a simplified diagram showing mapping overlapping datasets onto a single column of pixels according to at least one embodiment.

FIG. 4 is a simplified diagram showing mapping overlapping datasets onto a single column of pixels according to at least one embodiment. Client system 402 has received code from the visualization generation system that causes the client system 402 to display a graphical user interface 404. Columnar area 406 is an expanded view of a columnar area of pixels from graphical user interface 404. While a single column of pixels is depicted in this simplified diagram, the columnar area 406 can be any width of pixels (e.g., 1 pixel, 6 pixels, 10 pixels, 60 pixels, 100 pixels 200 pixels, 600 pixels, 1000 pixels, and 6000 pixels).

Figure 5:
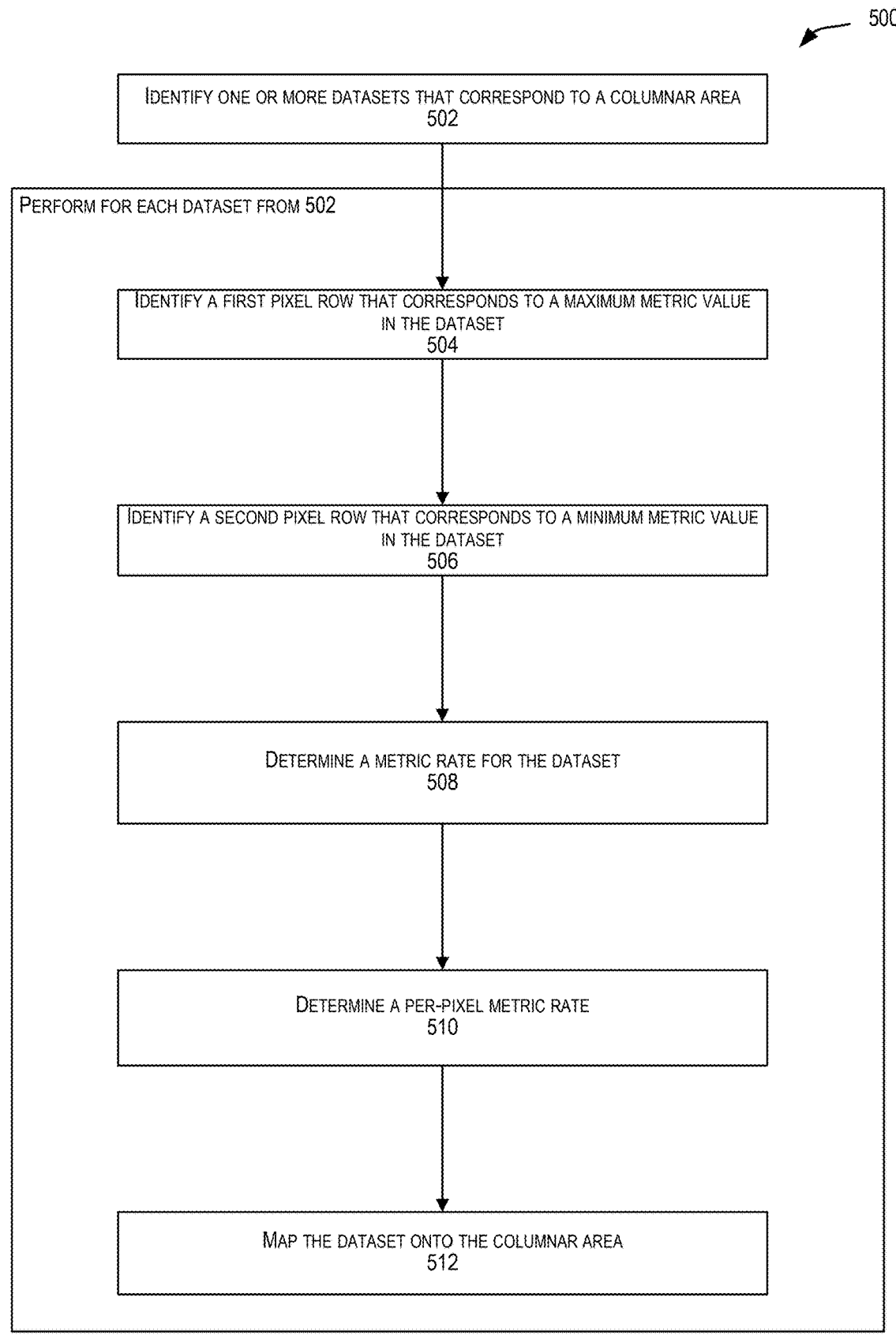
FIG. 5 is a simplified diagram of a technique for heatmap pixel mapping according to at least one embodiment.

FIG. 5 is a simplified diagram 500 of a technique for heatmap pixel mapping according to at least one embodiment. Turning now to FIG. 5, and with reference to FIG. 4, at step 502, one or more datasets that correspond to a columnar area can be identified. For example, dataset 408 and dataset 410 can correspond to columnar area 406 because both datasets include metric data that was generated during the same time period (e.g., that corresponds to columnar area 406). For example, both datasets could include trace data that was generated during a 6 second interval. Metric data (e.g., trace data) can be generated in a time period if a particular event that is represented by the metric data was initiated during the time period, if the event concluded during the time period, or if the metric data was recorded during the time period.

Blocks 504-516 can be performed for each dataset that corresponds to a columnar area. For example, dataset 408 and dataset 410 can be mapped onto columnar area 406. Columnar area 406 can represent metric data representing traces with a duration between 20 nanoseconds and 100 nanoseconds. For this simplified diagram, the scale is linear with each pixel in columnar area 406 corresponding to a 6-nanosecond range of trace durations. The bottom surface of the lowest pixel in columnar area 406 represents traces with a 20-nanosecond trace duration and the top surface of the highest pixel in columnar area 406 representing traces with a 100-nanosecond trace duration.

Dataset 408 includes traces with a trace duration from 60-nanoseconds to 100-nanoseconds. For example, at least one trace in dataset 408 has a duration of 60-nanoseconds and at least one trace has a duration of 100-nanoseconds. The distribution of traces within dataset 408 may be evenly distributed along the range of trace durations or concentrated at any number of points within the range. The dataset engine may determine statistics or other information about data and use these statistics to group the data into datasets. For example, data may be grouped into a dataset as long as the magnitude of the difference in trace duration between proximate traces is below a threshold. In another example, data may be grouped into a dataset (e.g., data set) if the standard deviation of the dataset is below a threshold or the dataset may be rejected if the standard deviation of the data within the set is above a threshold.

At block 504, a first pixel row that corresponds to a maximum metric value of a dataset from 502 can be identified. For example, pixel row 409 can be a first pixel row in columnar area 406 that corresponds to the maximum metric value (e.g., trace duration) of a datum within dataset 408 (e.g., the upper row of pixels). pixel row 413 can be a first pixel row in columnar area 406 that corresponds to the maximum metric value (e.g., trace duration) of a datum within dataset 410 (e.g., the upper row of pixels). A pixel row can correspond to a maximum metric value of a dataset if the maximum metric value is within the range of metric values represented by the pixel row.

At block 504, a second pixel row corresponding to the minimum metric value in a dataset can be identified. For example, pixel row 411 that corresponds to a minimum metric value of a datum within dataset 408 (e.g., a lower row of pixels) can be identified in column 406. Pixel row 417 that corresponds to a minimum metric value of a datum within dataset 410 (e.g., a lower row of pixels) can be identified in column 406 A pixel row can correspond to a minimum metric value of a dataset if the minimum metric value is within the range of metric values represented by the pixel row.

At block 506, a metric rate can be calculated for the dataset. The count of individual datum within dataset 408 can be divided by the time period corresponding to the dataset to determine a metric-rate.

At block 508, a per-pixel metric rate can be determined. For example, the metric-rate from 506 can be divided by the number of pixels (e.g., inclusive or exclusive) between the upper row of pixels and the lower row of pixels to determine a per-pixel-metric-rate.

Line 412 can represent the metric value of the maximum metric value in dataset 408 and line 414 can represent the metric value of the minimum metric value in the dataset. Each pixel can represent a range of metric values, and the metric-rate for the upper row of pixels or the lower row of pixels may be adjusted if the range of metric values represented by the rows of pixels and the range of metric values in a dataset are not coextensive. In this example, both line 412 and line 414 correspond to a point separating sequential pixels. Therefore, the per-pixel-metric-rate of the upper row of pixels or the lower row of pixels may not need to be adjusted to account for the dataset ending within the range of metric values represented by either pixel (e.g., either row of pixels). Accordingly, the pixels representing dataset 408 (e.g., separate pixel rows 416 and overlapping pixel rows 418) can be incremented by the per-pixel-metric-rate.

Dataset 410 can include traces (e.g., data) with trace durations (e.g., metric values) between 27.5 nanoseconds (e.g., corresponding to line 420) and 80 nanoseconds (e.g., corresponding to line 422). The metric-rate (e.g., the trace-count-per-second) for dataset 410 can be calculated by dividing a count of the datum in the dataset by the time period corresponding to the dataset.

The per pixel metric rate for dataset 410 can be determined by dividing the metric-rate by the number of pixel rows in columnar area 406 that are to be used to display dataset 410. In this example, the lower endpoint for metric values in dataset 410 ends in the middle of a pixel row, and the number of pixels is not a round integer (e.g., a whole number). Instead, dataset 410 is represented by 10.5 pixel rows including overlapping pixel rows 418, separate pixel rows 424, and fractional pixel row 426. Accordingly, the per pixel metric-rate is the metric-rate divided by 10.5 pixels. In some implementations, the pixel rate can be calculated by rounding up the number of pixels to the next round pixel (e.g., from 10.5 pixels to 11 pixels), or rounding down to the next round pixel (e.g., from 10.5 pixels to 10 pixels). Whether the pixel is rounded up or down can depend on whether the fractional pixel corresponds to the maximum metric-rate or the minimum metric-rate. In some embodiments, a fractional pixel that corresponds to the maximum metric rate can be rounded down to the next whole pixel and a fractional pixel that corresponds to the minimum metric rate can be rounded down to the next whole pixel.

At block 510, the dataset can be mapped onto the columnar area. For example, dataset 408 can be mapped onto the columnar area 406 by incrementing a value corresponding to each pixel within the upper and lower rows of pixels (e.g., including or excluding one or more of the upper row and the lower row) by the per-pixel-metric-rate determined at 510.

The per pixel metric-rate that is used to increment each pixel can be modified by the percentage of the pixel that would be included in the dataset based on the range of metric values represented by the pixel. For example, fractional pixel row 426 includes half of a pixel row (e.g., 60% of a pixel row) and, therefore, the value representing pixel 428 can be incremented by the per-pixel-metric-rate multiplied by 0.5 (e.g., because line 420 divides pixel 428 in half). The remaining pixels represented by dataset 410 (e.g., overlapping pixel rows 418 and separate pixel rows 424) can be incremented by the per-pixel-metric-rate.

In some embodiments, the per-pixel-metric-rate may be calculated by excluding an entire fractional pixel row (e.g., by rounding down to the nearest whole number). For example, the number of pixel rows used to determine the per-pixel-metric-rate may be rounded down if the proportion of a fractional pixel row corresponds to a dataset is below a threshold. In some embodiments, the per-pixel-metric-rate may be calculated by including an entire fractional pixel row (e.g., by rounding up to the nearest whole number). For example, the number of pixel rows used to determine the per-pixel-metric-rate may be rounded up if the proportion of a fractional pixel corresponds to a dataset is above a threshold. Any combination of these embodiments is contemplated. Upon or after the per-pixel-metric-rate is determined, the pixel rows can be rendered in colors corresponding to the values for the pixel rows.

Figure 6:
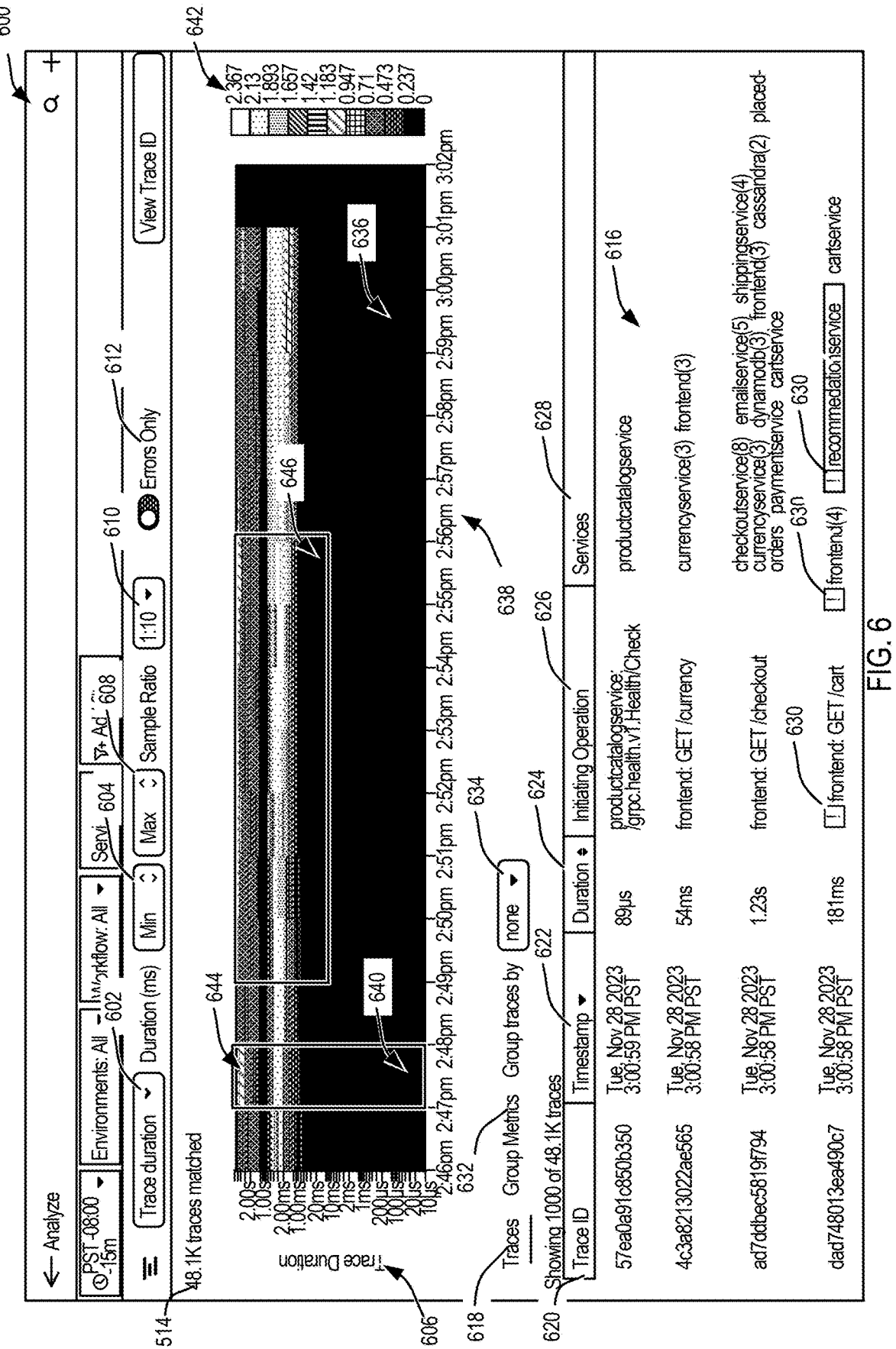
FIGS. 6-7 show simplified diagrams of user interfaces for displaying heatmap visualizations according to at least one embodiment.

FIG. 6 shows a simplified diagram of a user interface 600 for displaying heatmap visualizations according to at least one embodiment. User interface 600 can be used to provide a request for a heatmap visualization. For example, interactive graphic element 602 can be used to specify a metric for the heatmap visualization. As shown in user interface 600, the specified metric is "trace duration," but other metrics such as trace count, error count, or trace and error count are contemplated. In a trace count, error count, or trace and error count visualization, the y-axis 606 can display a number of traces that correspond to the time period on the x-axis. In a trace and error count visualization, traces can be displayed in a first color and traces with errors (e.g., errors) can be displayed in a second color. Interactive graphic element 604 can be used to specify a minimum metric value for the heatmap visualization. As shown in user interface 600, the minimum metric value may have been specified as 10 microseconds (μs) because the minimum metric value on y-axis 606 is 10 microseconds. Interactive graphic element 608 can be used to specify a maximum metric value for the heatmap visualization. As shown in user interface 600, the maximum metric value may have been specified as 2.40 seconds(s) because the maximum metric value on y-axis 606 is 2.40 seconds. In some embodiments, the specified and displayed minimum and maximum metric values can differ and, for example, a specified metric value may be rounded to a nearest decimal value. Interactive graphic element 610 can be used to specify a sample ratio. The sample ratio can refer to the percentage of the available data that is used for metric calculations and UI visualization. For example, if there are 50 traces that match a specific query, a 1:10 sample ratio means the data store will return datasets for 5 traces for the UI visualization. The sample ratio can improve performance because there is less data to visualize and therefore the visualization can be generated more rapidly with fewer computing resources. Interactive graphic element 612 can be used to specify that the heatmap visualization display metric values that correspond to errors. For example, an error for a heatmap visualization showing trace duration can be a trace for which one or more operations failed to execute or resulted in an error message. In some embodiments, there can be fields for specifying a maximum or minimum time period for the heatmap visualization.

The visualization generation system implementing user interface 600 can use the values specified in a request from the user interface to retrieve matching metrics for a heatmap visualization. Matching metrics for a request can be metrics with values that are within the ranges identified in the request. For example, field 614 displays a number of matching metric values (e.g., traces) that correspond to the request. These metrics can be included in any number of datasets. Graphical user interface 600 can display information about the retrieved metrics in field 616. Interactive graphic element 618 can be used to cause field 616 to display individual traces that can be organized by a unique identifier for each trace (e.g., trace identifier (ID) 620), a timestamp for each trace 622, a trace duration 624, an operation 626 that initiated the trace, and one or more services 628 associated with the trace. Interactive graphical elements 630 can visually identify a trace that is associated with an error and selecting any of the elements can be used to request information about the error from the visualization generalization system.

Interactive graphical element 632 can be selected to cause the visualization generation system to cause the user interface to display information about group metrics in field 616. Group metrics can be metrics that are associated with each other in some way. For example, interactive graphic element 634 can be used to specify how the metrics are grouped, and, for example, the metrics can be grouped by region where the metric was generated, by initiating operation, by services associated with the metric, etc. In some embodiments, traces can be grouped by tags assigned to the traces. For example, submitting a tag name in interactive graphic element 634 can cause the UI to display a table with every possible value that matches the tag, and the number of traces that each of those tag values are associated with.

The heatmap visualization can be displayed in field 636 of the user interface 600. The heatmap visualization can be displayed with the y-axis 606 that provides information about metric values and an x-axis 638 that provides information about time periods during which the metric values are displayed. The columnar areas can correspond to one minute intervals on the x-axis 638, and, for example, columnar area 640 can correspond to metrics with timestamps between 2:47 pm and 2:48 pm. Legend 642 shows a color scale for the heatmap visualization. Each row of pixels can be colored according to the per-pixel-metric rate (e.g., the per-pixel-row-metric-rate) for each row of pixels (e.g., pixel rows 644).

Input to user interface 600 can cause the visualization generation system to "zoom into" the heatmap visualization. "Zooming into" the heatmap can mean that a separate request for a heatmap visualization is provided to the visualization generation system by the client system implementing user interface 600. The separate request can be input using interactive elements 602-612, or by an input identifying a region 646 of field 636. For example, the input can be a "drag and drop" selection of region 646 (e.g., a user can provide a first input for one corner of region 646 and a second input for a diagonal corner of region 646). This input can cause the user interface 600 to display user interface 700 as shown in FIG. 7.

Figure 7:
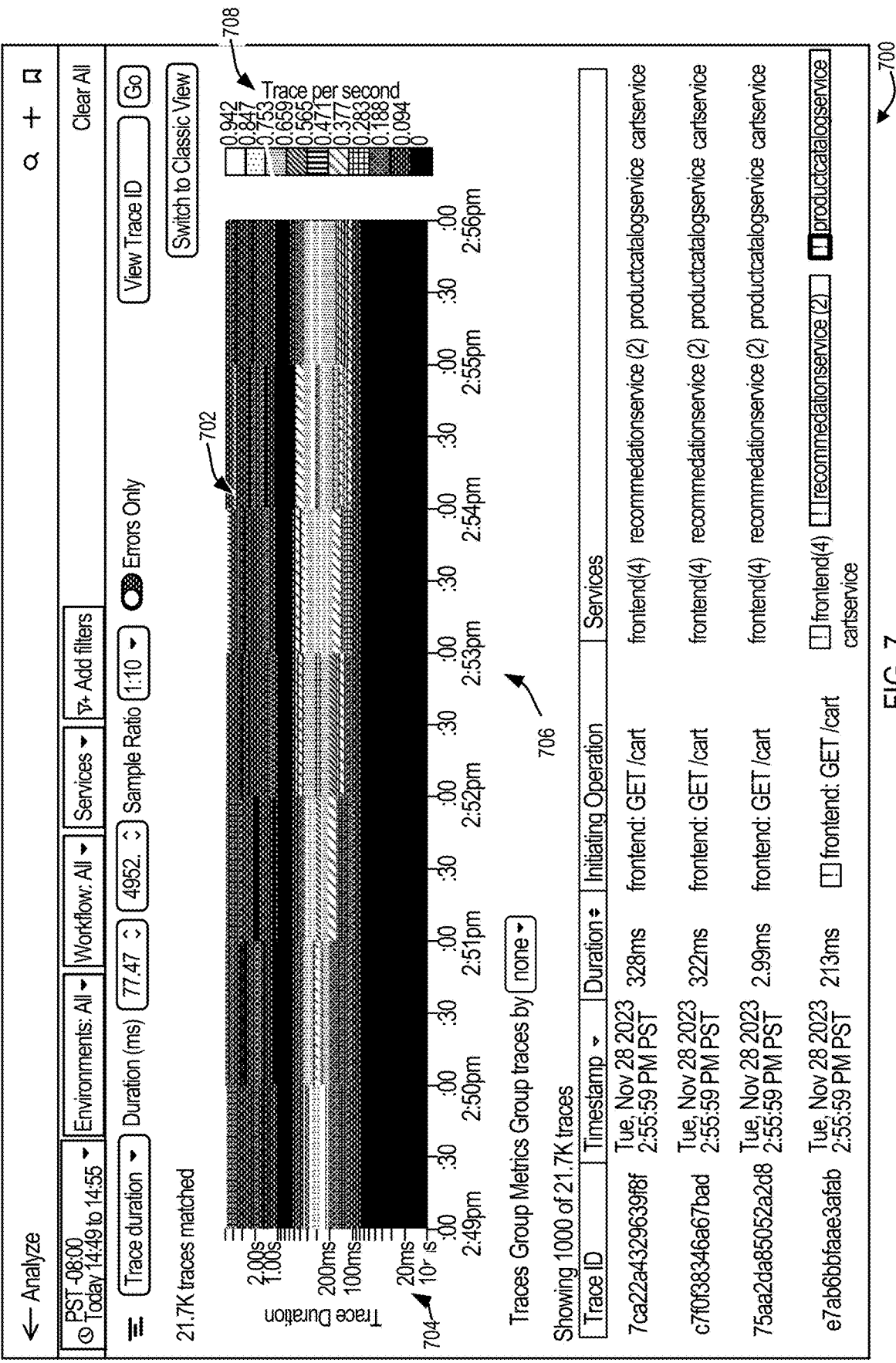

FIG. 7 shows a simplified diagram of a user interface 700 for displaying heatmap visualizations according to at least one embodiment. Field 702 in user interface 700 displays a heatmap visualization that corresponds to region 646 from user interface 600. The range of metric values shown on y-axis 704 and the range of time values on the x-axis 706 correspond to the range of x-values and y-values that are included in region 646. The visualization shown in field 702 can be a separately generated heatmap visualization and the visualization may not be a cropped and enlarged version of the heatmap visualization from user interface 600. For example, the input identifying region 646 may cause the visualization generation system implementing user interface 700 to identify datasets based on the metric and time values corresponding to the identified region. These datasets can be provided by the visualization generation system to the client system implementing the user interface 700 so that the client system can generate the heatmap visualization shown in field 702. Accordingly, the legend 708 in user interface 700 can be different than the legend 642 from user interface 600.

FIG. 8 shows a flowchart of a method 800 for generating a heatmap visualization according to at least one embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the method.

Turning to method 800 in greater detail, at block 802, a request for a heatmap visualization can be received for a plurality of datasets. The visualization can include a first axis that represents a plurality of timepoints and a second axis representing values associated with a metric (e.g., trace duration). The request can be received from a client system (e.g., client system 150) via a user interface (e.g., user interfaces 151, and 600-700). Each dataset (e.g., datasets 408 and 410) can include a time information (e.g., a time period) for the dataset and a range of dataset values (e.g., a maximum metric value and a minimum metric value). The dataset can include a count identifying the number of instances of data (e.g., datum) within the dataset. The time information can comprise a plurality of timepoints corresponding to the plurality of datasets. The number of timepoints of the plurality of timepoints can be less than a number of datasets in the plurality of datasets (e.g., two or more datasets can correspond to a single timepoint). The request to display the visualization can include information identifying a first axis of pixels for the visualization and a second axis of pixels for the visualization (e.g., by dragging and dropping in a user interface). The first axis and the second axis can be identified by input identifying a first coordinate for a first corner of the visualization and a second coordinate for a second corner of the visualization that is diagonally opposite of the first corner. The request to display the visualization can be received from a web browser application (e.g., a user interface) that is executing on a client device (e.g., client system 150).

Blocks 804-808, can be performed for a first dataset in the plurality of datasets. Blocks 804-808 can be performed for any number of datasets including a second dataset. At block 804, a first timepoint can be identified based on the information associated with the first dataset. The first dataset can be a dataset from the plurality of datasets that are requested at 802. The first timepoint can be a time period, a time range, a point in time, etc. The number of distinct timepoints can be less than the number of datasets (e.g., two or more datasets can correspond to a single timepoint).

At block 806, a columnar area of pixels in the visualization can be identified. The columnar area can correspond to the first timepoint. For example, the columnar area can be columnar area 406 from FIG. 4. The columnar area can include a width of pixels (W) and a height of pixels (H). In various embodiments, W or H can be discrete integer values or continuous numbers.

At block 808, a first portion of the columnar area for displaying the first dataset can be identified. For example, the first dataset can be dataset 408 and the first portion can be a combination of separate pixel rows 416 and overlapping pixel rows 418. The first portion can be identified by determining a lower row of pixels of the columnar area of pixels based on a lowest value in the range of metric values corresponding to the first dataset from 804, and determining an upper row of pixels of the columnar area based on a highest value in the range of metric values corresponding to the first dataset. The first portion of the columnar area can be characterized by a first height of pixels starting at the lower row and ending at the upper row of pixels (e.g., separate pixel rows 416 and overlapping pixel rows 418).

At block 810, a first color for displaying the first portion from 808 can be determined. The first color can be determined from a plurality for colors for representing the first dataset from 804. The first color can be determined by calculating a metric rate for the dataset. This metric rate can be calculated by taking the number of instances of data in the dataset, by the range of metric values (e.g., the maximum metric value minus the minimum metric value). This metric rate can be divided by the number of pixel rows (e.g., height H) to determine a per-pixel-metric-rate. The per-pixel-metric rate can be used to increment a value associated with each pixel row, and, after the per-pixel-metric rate for each dataset from 802 is determined and used to increment the values, a maximum value can be determined. This maximum value can be divided by the number of colors in the plurality of colors to determine a metric range for each color. Each pixel row can be rendered in the color that has a metric range that includes the value for that pixel row.

At block 812, the requested visualization from 802 can be displayed. The first axis of the visualization can represent the plurality of timepoints (e.g., x-axis 638) and the second axis representing values associated with the metric (e.g., y-axis 606), and the first portion representing the first dataset rendered in the first color. In some embodiments, the dataset can be represented by a number of colors, and the color for each row of pixels can be determined based on the value associated with the color.

To display a second dataset, a timepoint can be identified based on the time information associated with the second dataset. The second dataset can include time information and a range of metric values. The timepoint can be the first timepoint from 804 or a second timepoint along the first axis (e.g., x-axis) that is different than the first timepoint. A columnar area of pixels in the visualization that correspond to the identified timepoint can be identified. The columnar area can the columnar area that is identified at 806. A second portion of the columnar area for representing the second dataset can be identified based on the range of metric values that are included in the second dataset. The lowest value in the range of metric values can be used to identify a second lower row of pixels in the columnar area, and the highest value in the range of metric values can be used to identify a second upper row of pixels in the columnar area.

The first portion and the second portion can overlap or be coextensive in various embodiments. In such embodiments, an overlap portion of the columnar area of pixels for representing both the first dataset and the second dataset can be identified based upon a range of metric values included in both the first dataset and the second dataset. The overlap portion can be identified by determining a second lower row of pixels of the columnar area of pixels based on a lowest value in the range of metric values included in both the first dataset and the second dataset, and determining a second upper row of pixels of the columnar area based on a highest value in the range of metric values included in both the first dataset and the second dataset. This overlap portion of the columnar area can be characterized by a second height of pixels starting at the second lower row and ending at the second upper row of pixels.

The second portion of the columnar area (e.g., for both overlapping and non-overlapping datasets) can be characterized by a second height of pixels starting at the second lower row of pixels and ending at the second upper row of pixels. The second height of pixels can be different from the first height of pixels in some embodiments. The second height of pixels and the first height of pixels may have the same number of pixels, but the two heights can be different if the two heights of pixels are not coextensive. A second color can be determined from the plurality of pixels from 810. The first color and the second color can be the same color or different colors in various embodiments. The colors can be determined based on the per-pixel-metric-rate for each pixel. The per-pixel-metric-rate may be used to increment a value associated with each pixel, and, in some embodiments, each dataset in the heatmap visualization may be mapped to pixels before the colors for each pixel are determined.

FIG. 9 shows a flowchart of a method 900 for generating a heatmap visualization according to at least one embodiment. This method is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the method.

Turning to method 900 in greater detail, at block 902, a request for a heatmap visualization can be received for a plurality of datasets. The visualization can include a first axis that represents a plurality of timepoints and a second axis representing values associated with a metric (e.g., trace duration). The request can be received from a client system (e.g., client system 150) via a user interface (e.g., user interfaces 151, and 600-700). Each dataset (e.g., datasets 408 and 410) can include a time information (e.g., a time period) for the dataset and a range of dataset values (e.g., a maximum metric value and a minimum metric value). The dataset can include a count identifying the number of instances of data (e.g., datum) within the dataset. The time information can comprise a plurality of timepoints corresponding to the plurality of datasets. The number of timepoints of the plurality of timepoints can be less than a number of datasets in the plurality of datasets (e.g., two or more datasets can correspond to a single timepoint). The request to display the visualization can include information identifying a first axis of pixels for the visualization and a second axis of pixels for the visualization (e.g., by dragging and dropping in a user interface). The first axis and the second axis can be identified by input identifying a first coordinate for a first corner of the visualization and a second coordinate for a second corner of the visualization that is diagonally opposite of the first corner. The request to display the visualization can be received from a web browser application (e.g., a user interface) that is executing on a client device (e.g., client system 150).

Blocks 904-912, can be performed for a first dataset in the plurality of datasets to determine a corresponding color for each pixel in the visualization. The corresponding color can be selected from a plurality of colors. The corresponding color can be determined based at least in part on a corresponding metric value for each pixel in the visualization. The metric value can be a count of metrics that correspond to the area of the visualization that is occupied by the pixel, or row of pixels. Blocks 904-912 can be performed for any number of datasets including a second dataset. At block 904, a first timepoint can be identified based on the information associated with the first dataset. The first dataset can be a dataset from the plurality of datasets that are requested at 902. The first timepoint can be a time period, a time range, a point in time, etc. The number of distinct timepoints can be less than the number of datasets (e.g., two or more datasets can correspond to a single timepoint).

At block 906, a columnar area of pixels in the visualization can be identified. The columnar area can correspond to the first timepoint. For example, the columnar area can be columnar area 406 from FIG. 4. The columnar area can include a width of pixels (W) and a height of pixels (H). In various embodiments, W or H can be discrete integer values or continuous numbers. The height of pixels (H) can correspond to a metric visualization range (e.g., a range of metric values that are to be included in the visualization; 10 ns to 20 us in FIG. 3). Each pixel in the height of pixels (H) can correspond to a metric visualization subrange from the metric visualization range. The metric visualization subranges of two sequential vertical pixels can correspond to two sequential and contiguous ranges of metric values.

At block 908, a first portion of the columnar area for displaying the first dataset can be identified. For example, the first dataset can be dataset 408 and the first portion can be a combination of separate pixel rows 416 and overlapping pixel rows 418. The first portion can be identified by determining a lower row of pixels of the columnar area of pixels based on a lowest value in the range of metric values corresponding to the first dataset from 904, and determining an upper row of pixels of the columnar area based on a highest value in the range of metric values corresponding to the first dataset. The first portion of the columnar area can be characterized by a first portion height of pixels (P) starting at the lower row and ending at the upper row of pixels (e.g., separate pixel rows 416 and overlapping pixel rows 418). The first portion can have a first portion width of pixels (W).

The first portion heigh of pixels (P) can be determined by identifying a maximum dataset value and a minimum dataset value from the range of metric values for the first dataset. The maximum dataset value can be a datapoint in the dataset with a largest metric magnitude. The minimum dataset value can be a datapoint in the dataset with a smallest metric magnitude. A maximum pixel and a minimum pixel for the first portion height of pixels (P) can be determined based at least in part on the maximum dataset value, the minimum dataset value, and the metric visualization subranges for the pixels of the height of pixels (H).

The maximum pixel can be identified by identifying a first metric visualization subrange (e.g., of the metric visualization subranges of the height of pixels (H)) that includes the maximum dataset value. The minimum pixel can be identified by identifying a second metric visualization subrange (e.g., of the metric visualization subranges of the height of pixels (H)) that includes the minimum dataset value. In some embodiments, the proportion of the first or second metric subrange that is within the range of metric values can be determined. For example, the subrange can be separated (e.g., inclusively or exclusively) by the maximum or minimum value and the proportion can be determined by dividing either half of the separated subrange by the total length of the subrange. The proportion can be compared to one or more thresholds. For example, if the proportion exceeds a threshold, the pixel that includes the maximum or minimum value can be included as an endpoint to the first portion heigh of pixels (P). In some embodiments, the metric-per-pixel rate can be divided by the proportion and the pixel's metric value may be incremented by the divided metric-per-pixel rate at 912.

At block 910, a first metric-per-pixel rate associated with the first dataset can be identified. The first metric-per-pixel rate can be identified based on the first portion height of pixels and a metric rate associated with the first dataset. A first metric rate associated with the first dataset can be determined by dividing the metric count for the first dataset by a time interval between the first timepoint and the second timepoint (e.g., from the time information for the dataset). The first metric-per-pixel rate can be determined by dividing the first metric rate by the first portion height of pixels (P) or the total number of pixels in the first portion. This process can be performed for any dataset of the plurality of datasets.

At block 912, a first metric value for each pixel in the first portion of the columnar area from 908 can be incremented by the first metric-per-pixel rate from 910. In some embodiments, first metric value for each row of pixels (e.g., a row with width W) in the first portion of the columnar area from 908 can be incremented by the first metric-per-pixel rate from 910.

At block 914, a corresponding color for each pixel in the first portion from 908 can be identified. In some embodiments, the corresponding color can be determined for each row of pixels (e.g., a row with width (W)). The corresponding color can be determined from a plurality for colors for representing the first dataset from 904. The corresponding color can be determined by calculating a metric rate for the dataset. This metric rate can be calculated by taking the number of instances of data in the dataset (e.g., the metric count), by the range of metric values (e.g., the maximum metric value minus the minimum metric value). This metric rate can be divided by the number of pixel rows (e.g., height H) to determine a per-pixel-metric-rate. The per-pixel-metric rate can be used to increment a value associated with each pixel row, and, after the per-pixel-metric rate for each dataset from 902 is determined and used to increment the values, a maximum value can be determined. This maximum value can be divided by the number of colors in the plurality of colors to determine a metric range for each color (e.g., a metric value subrange). Each pixel row can be rendered in the color that has a metric range that includes the value for that pixel row (e.g., by identifying the corresponding subrange that includes the metric value range for the pixel).

At block 916, the requested visualization from 902 can be displayed. The first axis of the visualization can represent the plurality of timepoints (e.g., x-axis 638) and the second axis representing values associated with the metric (e.g., y-axis 606), and the first portion representing the first dataset rendered in the first color. In some embodiments, the dataset can be represented by a number of colors, and the color for each row of pixels can be determined based on the value associated with the color.

To display a second dataset, a timepoint can be identified based on the time information associated with the second dataset. The second dataset can include time information and a range of metric values. The timepoint can be the first timepoint from 904 or a second timepoint along the first axis (e.g., x-axis) that is different than the first timepoint. A columnar area of pixels in the visualization that correspond to the identified timepoint can be identified. The columnar area can the columnar area that is identified at 906. A second portion of the columnar area for representing the second dataset can be identified based on the range of metric values that are included in the second dataset. The lowest value in the range of metric values can be used to identify a second lower row of pixels in the columnar area, and the highest value in the range of metric values can be used to identify a second upper row of pixels in the columnar area.

The first portion and the second portion can overlap or be coextensive in various embodiments. In such embodiments, an overlap portion of the columnar area of pixels for representing both the first dataset and the second dataset can be identified based upon a range of metric values included in both the first dataset and the second dataset. The overlap portion can be identified by determining a second lower row of pixels of the columnar area of pixels based on a lowest value in the range of metric values included in both the first dataset and the second dataset, and determining a second upper row of pixels of the columnar area based on a highest value in the range of metric values included in both the first dataset and the second dataset. This overlap portion of the columnar area can be characterized by a second height of pixels starting at the second lower row and ending at the second upper row of pixels.

The second portion of the columnar area (e.g., for both overlapping and non-overlapping datasets) can be characterized by a second height of pixels starting at the second lower row of pixels and ending at the second upper row of pixels. The second height of pixels (P2) can be different from the first height of pixels in some embodiments. The second height of pixels and the first height of pixels may have the same number of pixels, but the two heights can be different if the two heights of pixels are not coextensive. A second color can be determined from the plurality of colors. The first color and the second color can be the same color or different colors in various embodiments.

The colors can be determined based on the metric value for each pixel. The per-pixel-metric-rate for each dataset may be used to increment the metric value associated with each pixel, and, in some embodiments, each dataset in the heatmap visualization may be mapped to pixels before the colors for each pixel are determined. The second dataset can have a second metric rate that can be used to determine a second metric-per-pixel rate for the dataset. The second metric-per-pixel rate can be determined based at least in part on any combination of the second portion height of pixels (P2), the width of pixels (W), the second metric rate associated with the second dataset, and the second time information associated with the second dataset. In overlapping areas, the metric rate for the overlapping pixels can be a combination of the metric-per-pixel rates of the datasets that correspond to the overlapping area (e.g., the first dataset and the second dataset). The metric rate of the pixels in the overlapping area can be incremented by the metric-per-pixel rates of the datasets that correspond to the overlapping area (e.g., the metric-per-pixel rates can be summed).

Figure 10:
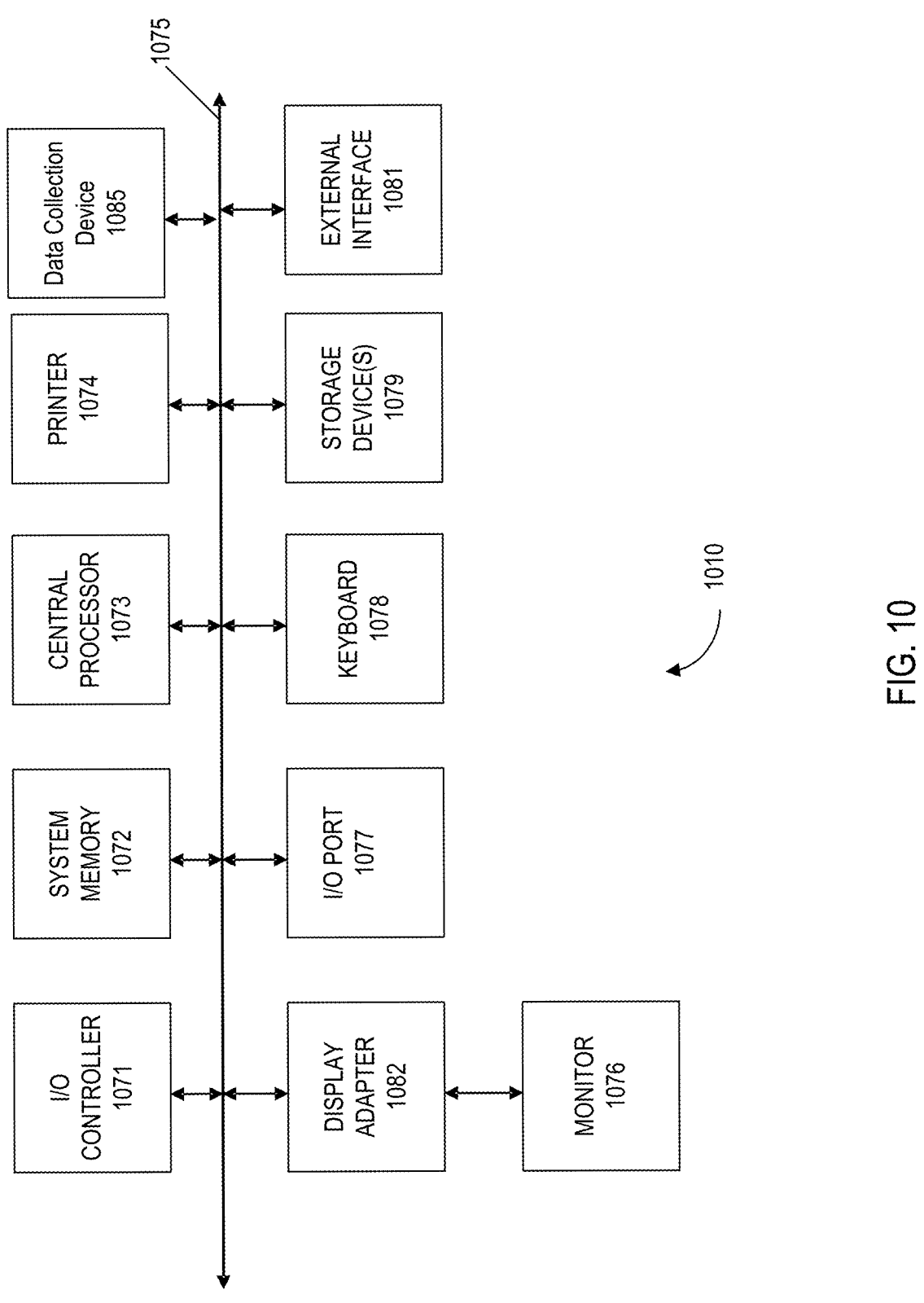
FIG. 10 shows a simplified diagram of a computer according to at least one embodiment.

Any of the computer systems mentioned herein may utilize any suitable number of subsystems. Examples of such subsystems are shown in FIG. 10 in computer system 1010. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 10 are interconnected via a system bus 1075. Additional subsystems such as a printer 1074, keyboard 1078, storage device(s) 1079, monitor 1076 (e.g., a display screen, such as an LED), which is coupled to display adapter 1082, and others are shown. Peripherals and input/output (I/O) devices, which couple to I/O controller 1071, can be connected to the computer system by any number of means known in the art such as input/output (I/O) port 1077 (e.g., USB, Fire Wire®). For example, I/O port 1077 or external interface 1081 (e.g. Ethernet, Wi-Fi, etc.) can be used to connect computer system 1010 to a wide area network such as the Internet, a mouse input device, or a scanner. The interconnection via system bus 1075 allows the central processor 1073 to communicate with each subsystem and to control the execution of a plurality of instructions from system memory 1072 or the storage device(s) 1079 (e.g., a fixed disk, such as a hard drive, or optical disk), as well as the exchange of information between subsystems. The system memory 1072 and/or the storage device(s) 1079 may embody a computer readable medium. Another subsystem is a data collection device 1085, such as a camera, microphone, accelerometer, and the like. Any of the data mentioned herein can be output from one component to another component and can be output to the user.

A computer system can include a plurality of the same components or subsystems, e.g., connected together by external interface 1081, by an internal interface, or via removable storage devices that can be connected and removed from one component to another component. In some embodiments, computer systems, subsystem, or apparatuses can communicate over a network.

In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software stored in a memory with a generally programmable processor in a modular or integrated manner, and thus a processor can include memory storing software instructions that configure hardware circuitry, as well as an FPGA with configuration instructions or an ASIC. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present disclosure using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk) or Blu-ray disk, flash memory, and the like. The computer readable medium may be any combination of such devices. In addition, the order of operations may be re-arranged. A process can be terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:

receiving, by a visualization generation system, a request to display a visualization for a plurality of datasets, the visualization comprising a first axis representing a plurality of timepoints and a second axis representing values associated with a metric, each dataset in the plurality of datasets comprising time information for the dataset, a range of metric values, and a metric count for the dataset;

determining a corresponding color from a plurality of colors for displaying each pixel in the visualization, the corresponding color determined based at least in part on a corresponding metric value for each pixel in the visualization, wherein determining the corresponding color for displaying each pixel in the visualization comprises for a first dataset in the plurality of datasets:

identifying a first timepoint along the first axis based upon a first time information associated with the first dataset;

identifying a columnar area of pixels in the visualization corresponding to the first timepoint, wherein the columnar area has a width of pixels (W) and a height of pixels (H);

identifying, based upon a first range of metric values included in the first dataset, a first portion of the columnar area of pixels for representing the first dataset, wherein the first portion has the width of pixels (W) and a first portion height of pixels (P);

identifying, based upon the first portion height of pixels (P) and a first metric rate associated with the first dataset, a first metric-per-pixel rate associated with the first dataset;

incrementing a first metric value for each pixel in the first portion of the columnar area of pixels by the first metric-per-pixel rate;

identifying the corresponding color for each pixel from the first portion of the columnar area based at least in part on the metric value for each pixel; and displaying the visualization, wherein the displayed visualization comprises:

the first axis representing the plurality of timepoints and the second axis representing values associated with the metric, and each pixel in the visualization rendered in the corresponding color.

2. The method of claim 1, wherein determining the corresponding color for displaying each pixel in the visualization further comprises:

identifying a maximum metric value in the visualization and a minimum metric value in the visualization, thereby identifying a metric value range;

segmenting the metric value range into a plurality of metric value subranges based on the plurality of colors, wherein each color in the plurality of colors corresponds to a subrange of the plurality of metric value subranges; and for each pixel in the visualization:

identifying a corresponding subrange that includes the metric value range, thereby determining the corresponding color from the plurality of colors.

3. The method of claim 1, wherein determining the corresponding color for displaying each pixel in the visualization further comprises:

for a second dataset in the plurality of datasets:

identifying the first timepoint along the first axis based upon a second time information associated with the second dataset;

identifying the columnar area of pixels in the visualization corresponding to the first timepoint;

identifying, based upon a second range of metric values included in the second dataset, a second portion of the columnar area of pixels for representing the second dataset, wherein the second portion has the width of pixels (W) and a second portion height of pixels (P2);

identifying, based upon the second portion height of pixels (P2), the width of pixels (W), and a second metric rate associated with the second dataset, a second metric-per-pixel rate associated with the second dataset;

incrementing a second metric value for each pixel in the second portion of the columnar area of pixels by the second metric-per-pixel rate; and identifying the corresponding color for each pixel from the second portion of the columnar area based at least in part on the metric value for each pixel.

4. The method of claim 3, wherein the first portion of pixels and the second portion of pixels overlap on a third portion of pixels, wherein a third metric value for each pixel in the third portion of pixels is a combination of the first metric-per-pixel rate and the second metric-per-pixel rate.

5. The method of claim 1, wherein identifying the first metric-per-pixel rate comprises:

identifying the first metric rate associated with the first dataset by dividing the metric count by a time interval between the first timepoint and a subsequent timepoint; and identifying the first metric-per-pixel rate by dividing the first metric rate by the first portion height of pixels (P).

6. The method of claim 1, wherein the height of pixels (H) corresponds to a metric visualization range, and each pixel of the height of pixels (H) in the columnar area corresponds to a metric visualization subrange, wherein identifying the first portion height of pixels (P) comprises:

identifying a maximum dataset value and a minimum dataset value of the range of metric values; and identifying a maximum pixel and a minimum pixel for the first portion height of pixels (P) based at least in part on the maximum dataset value, the minimum dataset value, and metric visualization subranges for the height of pixels (H).

7. The method of claim 6, wherein identifying the maximum pixel comprises:

identifying a first metric visualization subrange that includes the maximum dataset value;

determining a proportion of the first metric visualization subrange that is within the range of metric values;

comparing the proportion of the first metric visualization subrange to a threshold; and responsive to the proportion exceeding the threshold, identifying a first pixel that corresponds to the first metric visualization subrange as an endpoint of the first portion height of pixels (P).

8. A computing device, comprising:

a processor; and a non-transitory computer-readable medium having stored thereon instructions that, when executed by the processor, cause the processor to:

receiving, by a visualization generation system, a request to display a visualization for a plurality of datasets, the visualization comprising a first axis representing a plurality of timepoints and a second axis representing values associated with a metric, each dataset in the plurality of datasets comprising time information for the dataset, a range of metric values, and a metric count for the dataset;

determining a corresponding color from a plurality of colors for displaying each pixel in the visualization, the corresponding color determined based at least in part on a corresponding metric value for each pixel in the visualization, wherein determining the corresponding color for displaying each pixel in the visualization comprises for a first dataset in the plurality of datasets:

identifying a first timepoint along the first axis based upon a first time information associated with the first dataset;

identifying a columnar area of pixels in the visualization corresponding to the first timepoint, wherein the columnar area has a width of pixels (W) and a height of pixels (H);

identifying, based upon a first range of metric values included in the first dataset, a first portion of the columnar area of pixels for representing the first dataset, wherein the first portion has the width of pixels (W) and a first portion height of pixels (P):

identifying, based upon the first portion height of pixels (P) and a first metric rate associated with the first dataset, a first metric-per-pixel rate associated with the first dataset;

incrementing a first metric value for each pixel in the first portion of the columnar area of pixels by the first metric-per-pixel rate;

identifying the corresponding color for each pixel in the first portion of the columnar area based at least in part on the metric value for each pixel; and displaying the visualization, wherein the displayed visualization comprises:

the first axis representing the plurality of timepoints and the second axis representing values associated with the metric, and each pixel in the visualization rendered in the corresponding color.

9. The computing device of claim 8, wherein determining the corresponding color for displaying each pixel in the visualization further comprises:

identifying a maximum metric value in the visualization and a minimum metric value in the visualization, thereby identifying a metric value range;

segmenting the metric value range into a plurality of metric value subranges based on the plurality of colors, wherein each color in the plurality of colors corresponds to a subrange of the plurality of metric value subranges; and for each pixel in the visualization:

identifying a corresponding subrange that includes the metric value range, thereby determining the corresponding color from the plurality of colors.

10. The computing device of claim 8, wherein determining the corresponding color for displaying each pixel in the visualization further comprises:

for a second dataset in the plurality of datasets:

identifying the first timepoint along the first axis based upon a second time information associated with the second dataset;

identifying the columnar area of pixels in the visualization corresponding to the first timepoint;

identifying, based upon a second range of metric values included in the second dataset, a second portion of the columnar area of pixels for representing the second dataset, wherein the second portion has the width of pixels (W) and a second portion height of pixels (P2);

identifying, based upon the second portion height of pixels (P2), the width of pixels (W), and a second metric rate associated with the second dataset, a second metric-per-pixel rate associated with the second dataset;

incrementing a second metric value for each pixel in the second portion of the columnar area of pixels by the second metric-per-pixel rate; and identifying the corresponding color for each pixel in the second portion of the columnar area based at least in part on the metric value for each pixel.

11. The computing device of claim 10, wherein the first portion of pixels and the second portion of pixels overlap on a third portion of pixels, wherein a third metric value for each pixel in the third portion of pixels is a combination of the first metric-per-pixel rate and the second metric-per-pixel rate.

12. The computing device of claim 8, wherein identifying the first metric-per-pixel rate comprises:

identifying the first metric rate associated with the first dataset by dividing the metric count by a time interval between the first timepoint and a subsequent timepoint; and identifying the first metric-per-pixel rate by dividing the first metric rate by the first portion height of pixels (P).

13. The computing device of claim 8, wherein the height of pixels (H) corresponds to a metric visualization range, and each pixel of the height of pixels (H) in the columnar area corresponds to a metric visualization subrange, wherein identifying the first portion height of pixels (P) comprises:

identifying a maximum dataset value and a minimum dataset value of the range of metric values; and identifying a maximum pixel and a minimum pixel for the first portion height of pixels (P) based at least in part on the maximum dataset value, the minimum dataset value, and metric visualization subranges for the height of pixels (H).

14. The computing device of claim 13, wherein identifying the maximum pixel comprises:

identifying a first metric visualization subrange that includes the maximum dataset value;

determining a proportion of the first metric visualization subrange that is within the range of metric values;

comparing the proportion of the first metric visualization subrange to a threshold; and responsive to the proportion exceeding the threshold, identifying a first pixel that corresponds to the first metric visualization subrange as an endpoint of the first portion height of pixels (P).

15. A non-transitory computer-readable medium having stored thereon instructions that, when executed by one or more processors, cause the one or more processors to perform a process comprising:

receiving, by a visualization generation system, a request to display a visualization for a plurality of datasets, the visualization comprising a first axis representing a plurality of timepoints and a second axis representing values associated with a metric, each dataset in the plurality of datasets comprising time information for the dataset, a range of metric values, and a metric count for the dataset;

determining a corresponding color from a plurality of colors for displaying each pixel in the visualization, the corresponding color determined based at least in part on a corresponding metric value for each pixel in the visualization, wherein determining the corresponding color for displaying each pixel in the visualization comprises for a first dataset in the plurality of datasets:

identifying a first timepoint along the first axis based upon a first time information associated with the first dataset;

identifying a columnar area of pixels in the visualization corresponding to the first timepoint, wherein the columnar area has a width of pixels (W) and a height of pixels (H);

identifying, based upon a first range of metric values included in the first dataset, a first portion of the columnar area of pixels for representing the first dataset, wherein the first portion has the width of pixels (W) and a first portion height of pixels (P);

identifying, based upon the first portion height of pixels (P) and a first metric rate associated with the first dataset, a first metric-per-pixel rate associated with the first dataset;

incrementing a first metric value for each pixel in the first portion of the columnar area of pixels by the first metric-per-pixel rate;

identifying the corresponding color for each pixel in the first portion of the columnar area based at least in part on the metric value for each pixel; and displaying the visualization, wherein the displayed visualization comprises:

the first axis representing the plurality of timepoints and the second axis representing values associated with the metric, and each pixel in the visualization rendered in the corresponding color.

16. The non-transitory computer-readable medium of claim 15, wherein determining the corresponding color for displaying each pixel in the visualization further comprises:

identifying a maximum metric value in the visualization and a minimum metric value in the visualization, thereby identifying a metric value range;

segmenting the metric value range into a plurality of metric value subranges based on the plurality of colors, wherein each color in the plurality of colors corresponds to a subrange of the plurality of metric value subranges; and for each pixel in the visualization:

identifying a corresponding subrange that includes the metric value range, thereby determining the corresponding color from the plurality of colors.

17. The non-transitory computer-readable medium of claim 15, wherein determining the corresponding color for displaying each pixel in the visualization further comprises:

for a second dataset in the plurality of datasets:

identifying the first timepoint along the first axis based upon a second time information associated with the second dataset;

identifying the columnar area of pixels in the visualization corresponding to the first timepoint;

identifying, based upon a second range of metric values included in the second dataset, a second portion of the columnar area of pixels for representing the second dataset, wherein the second portion has the width of pixels (W) and a second portion height of pixels (P2);

identifying, based upon the second portion height of pixels (P2), the width of pixels (W), and a second metric rate associated with the second dataset, a second metric-per-pixel rate associated with the second dataset;

incrementing a second metric value for each pixel in the second portion of the columnar area of pixels by the second metric-per-pixel rate; and identifying the corresponding color for each pixel in the second portion of the columnar area based at least in part on the metric value for each pixel.

18. The non-transitory computer-readable medium of claim 17, wherein the first portion of pixels and the second portion of pixels overlap on a third portion of pixels, wherein a third metric value for each pixel in the third portion of pixels is a combination of the first metric-per-pixel rate and the second metric-per-pixel rate.

19. The non-transitory computer-readable medium of claim 15, wherein identifying the first metric-per-pixel rate comprises:

identifying the first metric rate associated with the first dataset by dividing the metric count by a time interval between the first timepoint and a subsequent timepoint; and identifying the first metric-per-pixel rate by dividing the first metric rate by the first portion height of pixels (P).

20. The non-transitory computer-readable medium of claim 15, wherein the height of pixels (H) corresponds to a metric visualization range, and each pixel of the height of pixels (H) in the columnar area corresponds to a metric visualization subrange, wherein identifying the first portion height of pixels (P) comprises:

identifying a maximum dataset value and a minimum dataset value of the range of metric values; and identifying a maximum pixel and a minimum pixel for the first portion height of pixels (P) based at least in part on the maximum dataset value, the minimum dataset value, and metric visualization subranges for the height of pixels (H).

* * * * *